US010834425B2

(12) United States Patent
Navarrete Michelini et al.

(10) Patent No.: US 10,834,425 B2
(45) Date of Patent: Nov. 10, 2020

(54) IMAGE COMPRESSION/DECOMPRESSION METHOD AND DEVICE, AND IMAGE PROCESSING SYSTEM

(71) Applicant: BOE TECHNOLOGY GROUP CO., LTD., Beijing (CN)

(72) Inventors: Pablo Navarrete Michelini, Beijing (CN); Hanwen Liu, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 153 days.

(21) Appl. No.: 16/184,142

(22) Filed: Nov. 8, 2018

(65) Prior Publication Data

US 2019/0141353 A1    May 9, 2019

(30) Foreign Application Priority Data

Nov. 9, 2017  (CN) .......................... 2017 1 1100322

(51) Int. Cl.
*H04N 19/61* (2014.01)
*H04N 19/17* (2014.01)
(Continued)

(52) U.S. Cl.
CPC .............. *H04N 19/61* (2014.11); *G06K 9/00* (2013.01); *G06K 9/6262* (2013.01);
(Continued)

(58) Field of Classification Search
CPC ...... H04N 19/61; H04N 19/126; H04N 19/17; H04N 19/172; H04N 19/63; H04N 19/00; G06K 9/00; G06K 9/6262
See application file for complete search history.

(56) References Cited

U.S. PATENT DOCUMENTS 4,718,091 A  *  1/1988  Kobayashi ................ G06T 1/20
                                                  382/162
5,333,263 A  *  7/1994  Masaki ................. G06F 7/5443
                                                  345/506
(Continued)

FOREIGN PATENT DOCUMENTS

CN          1107122826 A       9/2017

OTHER PUBLICATIONS

Wim Sweldens, The Lifting Scheme: A Construction of Second Generation Wavelets, Lucent Technologies, Bell Laboratories, Jul. 1995 (Revised Nov. 1997). pp. 1-35.

*Primary Examiner* — Dominic E Rego
(74) *Attorney, Agent, or Firm* — Dilworth & Barrese, LLP.; Michael J. Musella, Esq.

(57) ABSTRACT

There are disclosed an image compression method, device, and compression/decompression system, the image compression method including: receiving an input image; encoding the input image by utilizing n stages of encoding unit connected in cascades to produce an output image, where n is an integer greater than 1, wherein an input of an i-th stage of encoding unit is an i-th stage of encoding input image and includes $m^{i-1}$ image components, an output of the i-th stage of encoding unit is an i-th stage of encoding output image and includes $m^i$ image components, and the output of the i-th stage of encoding unit is an input of a (i+1)-th stage of encoding unit, where $1 \leq i < n$, m is an integer greater than 1; wherein the output image includes one image component as a reference image of the input image and $m^n - 1$ image components corresponding to the input image.

20 Claims, 26 Drawing Sheets

(51) Int. Cl.
*H04N 19/172* (2014.01)
*H04N 19/126* (2014.01)
*H04N 19/635* (2014.01)
*H04N 19/63* (2014.01)
*G06K 9/62* (2006.01)
*G06K 9/00* (2006.01)

(52) U.S. Cl.
CPC ........... *H04N 19/126* (2014.11); *H04N 19/17* (2014.11); *H04N 19/172* (2014.11); *H04N 19/63* (2014.11); *H04N 19/635* (2014.11)

(56) References Cited

U.S. PATENT DOCUMENTS

| | | | |
|---|---|---|---|
| 5,892,518 A * | 4/1999 | Mizobata | G06T 15/04 345/474 |
| 6,240,210 B1 * | 5/2001 | Koyama | H04N 19/61 375/E7.094 |
| 6,330,370 B2 * | 12/2001 | Goyal | H04S 1/00 382/251 |
| 6,678,422 B1 * | 1/2004 | Sharma | G06T 9/007 382/240 |
| 6,788,741 B1 * | 9/2004 | Ishikawa | H04N 19/533 348/E5.066 |
| 7,130,337 B2 * | 10/2006 | Hoobler | H04L 7/0008 375/222 |
| 7,236,636 B2 * | 6/2007 | Sakai | H04N 1/4105 375/E7.129 |
| 8,363,720 B2 * | 1/2013 | Fujii | H04N 19/126 375/240.03 |
| 8,441,530 B2 * | 5/2013 | Radeva | G06T 7/136 348/77 |
| 8,615,138 B2 * | 12/2013 | Alakuijala | H04N 19/91 382/232 |
| 8,665,943 B2 * | 3/2014 | Fukuhara | H04N 19/152 375/240 |
| 8,755,438 B2 * | 6/2014 | Layachi | H04N 19/105 375/240.16 |
| 8,908,984 B2 * | 12/2014 | Carmel | H04N 19/60 382/239 |
| 8,948,530 B2 * | 2/2015 | Wee | H04N 19/176 382/239 |
| 9,294,782 B1 * | 3/2016 | Eslami | H04N 19/63 |
| 9,449,259 B1 * | 9/2016 | Cheng | G06N 20/00 |
| 9,606,342 B2 * | 3/2017 | Cooper | G02B 26/0858 |
| 9,684,826 B2 * | 6/2017 | Dubuque | G06Q 30/06 |
| 9,693,072 B2 * | 6/2017 | Inada | H04N 19/587 |
| 9,934,751 B2 * | 4/2018 | Kim | H01L 27/124 |
| 9,979,969 B2 * | 5/2018 | Wee | H04N 19/126 |
| 10,291,918 B2 * | 5/2019 | Kodama | H04N 19/105 |
| 10,382,651 B2 * | 8/2019 | Eguchi | H04N 1/56 |
| 10,679,364 B2 * | 6/2020 | Tang | G06K 9/00 |
| 2003/0184453 A1 * | 10/2003 | Hall | H04N 19/196 341/51 |
| 2009/0092326 A1 * | 4/2009 | Fukuhara | H04N 19/176 382/233 |
| 2018/0184102 A1 | 6/2018 | Navarrete Michelini | |
| 2018/0315165 A1 | 11/2018 | Navarrete Michelini | |
| 2019/0014320 A1 | 1/2019 | Navarrete Michelini | |

* cited by examiner

1400

| receiving an input image | ─S1402 | image encoding the input image by utilizing n stages of encoding units connected in cascades to produce an output image, where n is an integer greater than or equal to 1, as for $1 \leq i < n$, an input of an i-th stage of encoding unit is an i-th stage of encoding input image and comprises $m^{i-1}$ image components, an output of the i-th encoding unit is an i-th stage of encoding output image and comprises $m^i$ image components, and the output of the i-th stage of encoding unit is an input of a (i+1)-th stage of encoding unit, where m is an integer greater than 1 ─S1404 performing a de-superimposing operation on $m^n-1$ image components corresponding to the input image and the reference image, to obtain a difference image of the $m^n-1$ image components and the reference image ─S1406 performing a quantization operation on the reference image and the $m^n-1$ image components ─S1408

- S1602: receiving a first encoding input component, a second encoding input component, a third encoding input component and a fourth encoding input component

- S1604: generating a predicted image based on the first encoding input component and the second encoding input component, and obtaining a difference image of the third encoding input component and the fourth encoding input component, and the predicted image

- S1606: generating updated images of the first encoding input component and the second encoding input component based on the difference image, the first encoding input component and the second encoding input component

- S1608: performing a wavelet transform based on an updated image, and generating a first encoding output component and a second encoding output component based on a result of the wavelet transform

- S1610: performing a wavelet transform based on a difference image, and generating a third encoding output component and a fourth encoding output component based on a result of the wavelet transform

| generating a third prediction feature by utilizing a second prediction convolutional network which takes a first superimposing feature as an input | ⟋S1802 |

| performing a de-superimposing operation on a second superimposing feature and a third prediction feature to obtain a second encoding output component | ⟋S1804 |

| generating a third updating feature by utilizing the second updating convolutional network which takes the second encoding output component as an input | ⟋S1806 |

| performing a superimposing operation on the first superimposing feature and the third updating feature to obtain a first encoding output component | ⟋S1808 |

| generating a fourth prediction feature by utilizing a third prediction convolutional network which takes a first difference feature as an input | ⟵ S1902 |

↓

| performing a de-superimposing operation on a second difference feature and a fourth prediction feature to obtain a fourth encoding output component | ⟵ S1904 |

↓

| generating a fourth updating feature by utilizing a third updating convolutional network which takes the fourth encoding output component as an input | ⟵ S1906 |

↓

| performing a superimposing operation on the first difference feature and the fourth updating feature to obtain a third encoding output component | ⟵ S1908 |

| receiving a compressed image, the compressed image including one image component as a reference image and $m^n-1$ image components | — S2002 |

| performing a superimposing operation on the $m^n-1$ image components and the reference image, to obtain $m^n-1$ superimposing images of the $m^n-1$ image components and the reference image | — S2004 |

| image decoding the compressed image by utilizing the n stages of decoding unit connected in cascades to produce a restore image, wherein as for $1 \leq i < n$, an input of an i-th stage of decoding unit is an i-th stage of decoding input image and comprises $m^i-1$ image components, an output of the i-th stage of decoding unit is an i-th stage of decoding output image and comprises $m^{i-1}$ image components, and the output of the i-th stage of decoding unit is an input of a (i+1)-th stage of decoding unit, where $1 \leq i < n$ | — S2006 |

| outputting the restore image corresponding to the compressed image | — S2008 |

- S2202: receiving a first decoding input component, a second decoding input component, a third decoding input component and a fourth decoding input component

- S2204: performing an inverse wavelet transform based on the first decoding input component and the second decoding input component, and obtaining a first difference feature and a second superimposing feature based on a result of the inverse wavelet transform

- S2206: performing an inverse wavelet transform based on the third decoding input component and the fourth decoding input component, and obtaining a second difference feature and a second superimposing feature based on a result of the inverse wavelet transform

- S2208: generating an updated image based on the second difference feature and the second superimposing feature, and generating a first decoding output component and a second decoding output component based on the updated image, the first difference feature and the first superimposing feature;

- S2210: generating a predicted image based on the first decoding output component and the second decoding output component, and generating a third decoding output component and a fourth decoding output component based on the predicted image, the second difference feature and the second superimposing feature

S2402 — generating a third update feature by utilizing a second update convolutional network which takes a second decoding input component as an input S2404 — performing a de-superimposing operation on a first decoding input component feature and the third update feature to obtain a first difference feature S2406 — generating a third updating feature by utilizing a second prediction convolutional network which takes the first difference feature as an input S2408 — performing a superimposing operation on the second decoding input component and the third prediction feature to obtain a first superimposing feature

| generating a fourth update feature by utilizing a third update convolutional network which takes a fourth decoding input component as an input; |—S2502

↓

| performing a de-superimposing operation on a third decoding input component and the fourth update feature to obtain a second difference feature |—S2504

↓

| generating a fourth prediction feature by utilizing a third prediction convolutional network which takes the second difference feature component as an input; |—S2506

↓

| performing a superimposing operation on the fourth decoding input component and the fourth prediction feature to obtain a second superimposing feature |—S2508

Fig. 25

IMAGE COMPRESSION/DECOMPRESSION METHOD AND DEVICE, AND IMAGE PROCESSING SYSTEM

CROSS-REFERENCE TO RELATED APPLICATION

The present application claims the priority of a Chinese patent application No. 201711100322.3 filed on Nov. 9, 2017. Herein, the content disclosed by the Chinese patent application is incorporated in full by reference as a part of the present application.

TECHNICAL FIELD

The present disclosure relates to image processing field, in particular to a compression encoding method, a compression encoding device, a decompression method, a decompression device and an image processing system comprising the compression encoding device and a decompression device.

BACKGROUND

A compression encoder is a system that takes digital information from a source, such as image or video, and compresses the information so that the total size used for storage or transmission reduces. The compression encoder is generally composed by three modules: transform coding, quantization and entropy encoder. The transform coding module is used to convert an input image into an image that is equivalent (the process can be reverted) but is easier to compress, which is achieved by decreasing redundancies in the image (typically with many contiguous zero values). The quantization module is used to limit the range of digital values obtained from the transform module. The entropy encoder module replaces most frequently data by small codes, and uses increasingly longer codes for less frequent data.

A decoder can recover the source information from the compressed data. Lossless compression refers to that the data source information can be recovered accurately after compression and decompression. Lossy compression refers to that the data source information cannot be recovered accurately, and the details that are more difficult to notice by human visual system are removed. A lossy compression can increase the compression factor by increasing the loss of details from the data source.

The quality of digital images and video is increasing quickly with recent standards such as BT.2020. The increase in quality is tied to an important increase in data size. Bit depth has increased from 8 to 10 or 12 bits per pixel, thus increasing the dynamic range of brightness and color data, and the number of pixels have increased 4 times from Full-HD to 4K resolution and 16 times from Full-HD to 8K resolution. At the same time the most popular source of media come from the Internet. Even though bandwidth increases steadily, a dramatic increase is expected from data traffic. This increase will come from more devices connected to the Internet (e.g. Internet of Things) as well as more media resources requested per devices. According to Cisco Visual Networking Index (VNI) reported in 2015: global mobile data traffic increased 69% in 2014 and video traffic for the first time in 2012. Latest video compression standards, such as High Efficiency Video Coding (HEVC) can reduce bitrates at same quality level up to 50%. This compression level is largely insufficient for the expected Internet bandwidth in next year, and the bandwidth requirements for high quality content. The success of display devices with high quality capabilities provided by new standards strongly depends on better solutions for media compression.

SUMMARY

According to one aspect of the present disclosure, there is provided an image compression method, comprising: receiving an input image; image encoding the input image by utilizing n stages of encoding units connected in cascades to produce an output image, where n is an integer greater than 1, wherein an input of an i-th stage of encoding unit is an i-stage of encoding input image and comprises $m^{i-1}$ image components, an output of the i-th stage of encoding unit is an i-stage of encoding output image and comprises $m^i$ image components, and the output of the i-th stage of encoding unit is an input of a (i+1)-th stage of encoding unit, where $1 \leq i < n$, and m is an integer greater than 1; outputting the output image, the output image including one image component as a reference image of the input image and ($m^n-1$) image components corresponding to the input image.

According to another aspect of the present disclosure, there is provided an image decompression method, comprising: receiving a compressed image, the compressed image including one image component as a reference image and ($m^n-1$) image components, where m is an integer greater than 1, and n is an integer greater than 1; image decoding the compressed image by utilizing n stages of decoding units connected in cascades to produce a restored image, wherein an input of an i-th stage of decoding unit is an i-stage of decoding input image and comprises $m^i$ image components, an output of the i-th stage of decoding unit is an i-stage of decoding output image and comprises $m^{i-1}$ image components, and the output of the i-th stage of decoding unit is an input of a (i+1)-th stage of decoding unit, where $1 \leq i < n$, and m is an integer greater than 1; outputting the restored image corresponding to the compressed image.

According to another aspect of the present disclosure, there is provided an image compression device, comprising: an input terminal, configured to receive an input image; n stages of encoding units connected in cascades, configured to image encode the input image to produce an output image, where n is an integer greater than 1, wherein an input of an i-th stage of encoding unit is an i-stage of encoding input image and comprises image components, an output of the i-th stage of encoding unit is an i-stage of encoding output image and comprises $m^i$ image components, and the output of the i-th stage of encoding unit is an input of a (i+1)-th stage of encoding unit, where $1 \leq i < n$, and m is an integer greater than 1; an output terminal, configured to output the output image, the output image including one image component as a reference image of the input image and ($m^n-1$) image components corresponding to the input image; a de-superimposing unit, configured to perform a de-superimposing operation on the ($m^n-1$) image components corresponding to the input image and the reference image, to obtain a difference image of the ($m^n-1$) image components and the reference image; a quantizing unit, configured to perform a quantization operation on the reference image and the ($m^n-1$) image components, to obtain a compressed image corresponding to the input image.

According to another aspect of the present disclosure, there is provided an image decompression device, comprising: an input terminal, configured to receive a compressed image, the compressed image including one image component as a reference image and (m$^n$−1) image components, where m is an integer greater than 1, and n is an integer greater than 1; an superimposing unit, configured to perform an superimposing operation on the (m$^n$−1) image components and the reference image, to obtain (m$^n$−1) superimposed images of the (m$^n$−1) image components and the reference image; n stages of decoding units connected in cascades, configured to image decode the compressed image to produce a restored image, wherein an input of an i-th stage of decoding unit is an i-stage of decoding input image and comprises m$^i$ image components, an output of the i-th stage of decoding unit is an i-stage of decoding output image and comprises m$^{i-1}$ image components, and the output of the i-th stage of decoding unit is an input of a (i+1)-th stage of decoding unit, where 1≤i<n, and m is an integer greater than 1; an output terminal, configured to output the restored image corresponding to the compressed image.

According to another aspect of the present disclosure, there is provided an image processing system, comprising the image compression device as described above and the image decompression device as described above.

According to another aspect of the present disclosure, there is provided a training method for the image processing system as described above, comprising: inputting a training image to the image processing system, adjusting weight values of respective convolutional networks in respective convolutional layers in n stages of encoding units and n stages of decoding units, and running a limited number of iterations to optimize a target function.

According to another aspect of the present disclosure, there is provided an image encoding method, comprising: receiving a first encoding input component, a second encoding input component, a third encoding input component and a fourth encoding input component; generating a predicted image based on the first encoding input component and the second encoding input component and obtaining a difference image of the third encoding input component and the fourth encoding input component, and the predicted image; generating an updated image relating to the first encoding input component and the second encoding input component based on the difference image, the first encoding input component and the second encoding input component; performing a wavelet transform based on the updated image, and generating a first encoding output component and a second encoding output component based on a result of the wavelet transform; performing a wavelet transform based on the difference image, and generating a third encoding output component and a fourth encoding output component based on a result of the wavelet transform.

According to another aspect of the present disclosure, there is provided an image decoding method, comprising: receiving a first decoding input component, a second decoding input component, a third decoding input component and a fourth decoding input component; performing an inverse wavelet transform based on the first decoding input component and the second decoding input component, and obtaining a first difference feature and a first superimposing feature based on a result of the inverse wavelet transform; performing an inverse wavelet transform based on the third decoding input component and the fourth decoding input component, and obtaining a second difference feature and a second superimposing feature based on a result of the inverse wavelet transform; generating an updated image based on the second difference feature and the second superimposing feature, and generating a first decoding output component and a second decoding output component based on the updated image, the first difference feature and the first superimposing feature; generating a predicted image based on the first decoding output component and the second decoding output component, and generating a third decoding output component and a fourth decoding output component based on the predicted image, the second difference feature and the second superimposing feature.

BRIEF DESCRIPTION OF THE DRAWINGS

In order to describe technical solutions of embodiments of the present disclosure more clearly. Accompanying figured needed to be used in description of the embodiments will be introduced below briefly. Obviously, the accompanying figures described below are just some embodiments of the present disclosure. For those ordinary skilled in the art, other figures can also be obtained based on these figures without paying any inventive labor. The following figures are not drawn and scaled in proportion in purpose according to actual sizes, and the key point is to present the substance of the present disclosure.

FIG. 14 shows a flow diagram of an image compression method according to according to some embodiments of the present application;

FIG. 16 shows a flow diagram of an image transform process of an i-th stage of transform encoding unit according to some embodiments of the present application;

FIG. 18 shows a flow diagram of a wavelet transform based on an updated image according to some embodiments of the present application;

FIG. 19 shows a flow diagram of a wavelet transform based on a difference image according to some embodiments of the present application;

FIG. 20 shows a flow diagram of an image compression method according to some embodiments of the present application;

FIG. 22 shows a flow diagram of an image inverse transform method according to some embodiments of the present application;

FIG. 24 shows a flow diagram of an inverse wavelet transform method based on a first decoding input component and a second decoding input component;

FIG. 25 shows a flow diagram of an inverse wavelet transform method based on a third decoding input component and a fourth decoding input component;

DETAILED DESCRIPTION

In order to make purposes, technical solutions and advantages of embodiments of the present disclosure more clear, the technical solution of the embodiments of the present disclosure will be described clearly and completely by combining with accompanying figured of embodiments of the present disclosure. Obviously, embodiments described herein are a part of embodiments of the present disclosure, but not all the embodiments. Based on the embodiments described herein, all the other embodiments obtained by those ordinary skilled in the art without paying any inventive labor belong to the scope sought for protection in the present disclosure.

Unless otherwise defined, technical terms or scientific terms used in the present disclosure shall have common meanings understood by those ordinary skilled in the art the present disclosure. "First", "second" or other similar words used in the present disclosure do not indicate any sequence, amount or importance, but are used for distinguishing different component parts. Likewise, "include" or "contain or other similar words means that an element or an object occurring prior to the word covers an element or an object or its equivalent listed subsequent to the word, without excluding other elements or objects. "Connected to" or "connected with" or other similar words are not limited to only physical or mechanical connection, but can comprise electrical connection or signal connection, regardless of direct or indirect connection.

The embodiments of the present disclosure introduce several configurations of the image compression device for image/video compression using convolutional networks. The image compression device according to the embodiments of the present disclosure can utilize the latest development and performance in Deep Learning to improve compression rates. Therefore, the method disclosed in the present application is capable of solving a requirement for a higher compression rate, and introduces machine learning as a major tool to reduce content-type redundancies.

Figure 1:
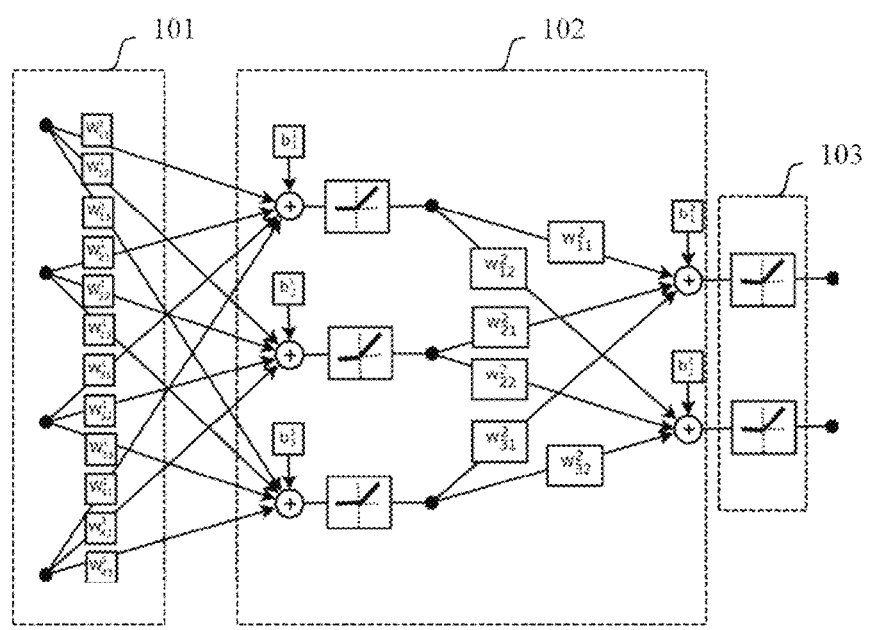
FIG. 1 is a schematic diagram illustrates a convolutional neural network for image processing.

FIG. 1 is a schematic diagram illustrates a convolutional neural network for image processing. A Convolutional Neural Network for image processing uses images as input/outputs and replaces scalar weights by filters (convolutions). A simple structure with 3 layers is shown in FIG. 1. As shown in FIG. 1, 4 input images are input at an output lay 101, and there are 3 units at a hidden layer 102 in the center to output 3 output images while there are 2 units at an output layer 103 to output 2 output images. Each box with weights $W_{ij}^k$ in the input layer 101 corresponds to a filter, where k is a label indicating an input layer number, and i and j are labels indicating input and output units, respectively. Biases $b_i^k$ are scalars added to the outputs of convolutions. The result of adding several convolutions and biases then passes through an activation box, that typically corresponds to a rectifying linear unit (ReLU), or sigmoid function, or hyperbolic tangent function, etc. In the image processing system using a convolutional neural network, the filters and biases are fixed during operation of the system, and obtained in advance by using a set of input/output example images and adjusted to fit some optimization criterion that depends on applications. Typical configurations involve tenths or hundreds of filters in each layer. A network with 3 layers is considered shallow, whereas numbers of layers greater than 5 or 10 is normally considered deep.

Figure 2:
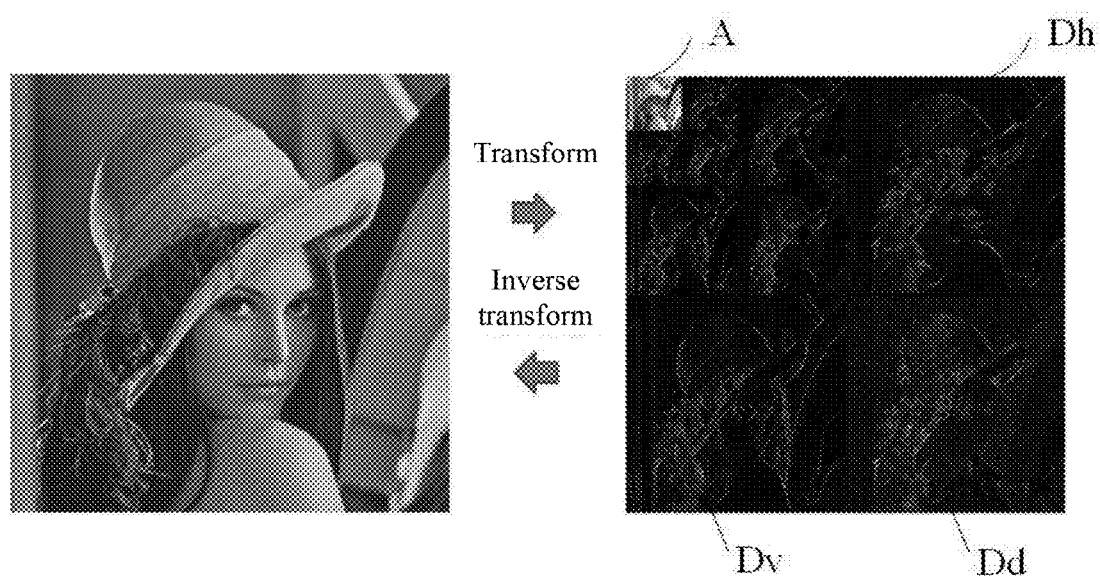
FIG. 2 is a schematic diagram illustrating a wavelet transform used for a multi-resolution image transform.

FIG. 2 is a schematic diagram illustrating a wavelet transform used for a multi-resolution image transform. Wavelet Transform is a multi-resolution image transform for an image encoding/decoding process. Applications of wavelet transform include transform coding in JPEG 2000 standard. In the image encoding (compression) process, the wavelet transform is used for representing an original high-resolution image with a smaller low-resolution image (for example, a part image of the original image). In the image decoding (decompression) process, inverse wavelet transform is used to restore and obtain the original image by utilizing a low-resolution image and a difference feature required to restore the original image.

FIG. 2 schematically shows a 3-level wavelet transform and an inverse transform. As shown in FIG. 2, one of the smaller low-resolution images is a downscale version A of the original image, and other low-resolution images represent the missing details (Dh, Dv and Dd) needed to recover the original image.

Figure 3:
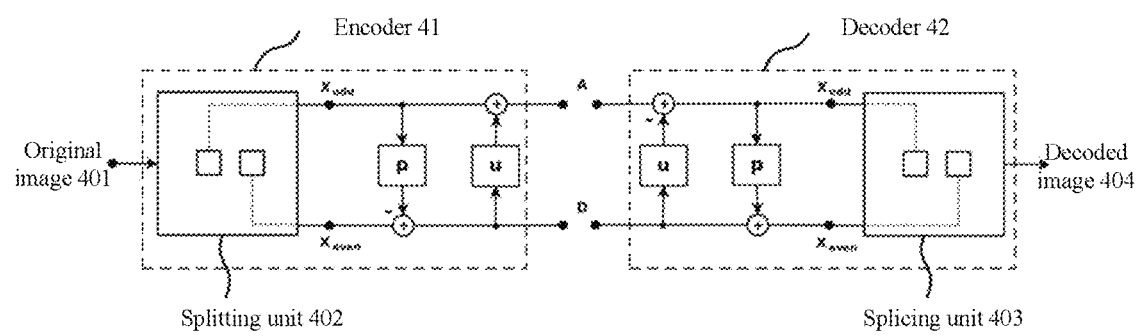
FIG. 3 is a schematic diagram of structure of an image processing system for realizing a wavelet transform by utilizing a convolutional neural network.

FIG. 3 is a schematic diagram of structure of an image processing system for realizing a wavelet transform by utilizing a convolutional neural network. Lifting Scheme is an efficient implementation of the wavelet transform and a flexible tool for constructing wavelets. A standard structure for 1D data is shown schematically in FIG. 3. The left side in FIG. 3 corresponds to an encoder 31. A splitting unit 302 in the encoder 31 transforms an input original image 301 into a low-resolution image A and a detail D. The encoder 31 further uses a prediction filter p and an updating filter u. For compression application it is desired that D≈0, so that most information is contained in A. The right side in FIG. 3 corresponds to a decoder 32. The parameters of the decoders 32 are exactly the same filters p and u from the encoder 32 but the filters p and u are arranged inversely. Since the encoder 31 is strictly corresponding to the decoder 32, this configuration ensures that a decoded image 304 obtained by splicing via a splicing unit 303 of the decoder 32 is completely the same as the original image 301. Additionally, the structure as shown in FIG. 3 is not limited, and can be alternatively configured in the decoder according to the sequence of the updating filter u and the prediction filter p. In the present application, the updating filter u and the prediction filter p can be implemented by using the convolutional neural network as shown in FIG. 1.

An image compression device, an image decompression device, an image processing system comprising the image compression/decompression device, a corresponding image compression/decompression method and a training method for configuring the image processing system according to the embodiments of the present disclosure will be described below in detail by referring to the accompanying figures.

Figure 4:
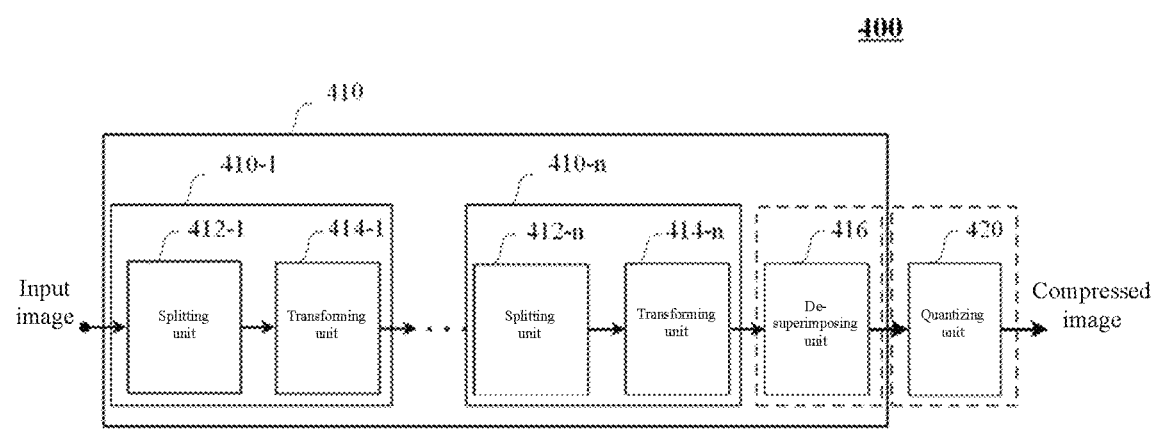
FIG. 4 shows a schematic diagram of an image compression device according to some embodiments of the present application.

FIG. 4 shows a schematic diagram of an image compression device according to some embodiments of the present disclosure. An image compression device 400 comprises a transform encoding unit 410.

The transform encoding unit 410 can comprise an input terminal used to receive an input image. The input image may be an image comprising only a single channel such as R, G, B or grey scale), or may be an image comprising a plurality of random channels (such as R, G, B and grey scale).

The transform encoding unit 410 can further comprise n stages encoding units 410-1, 410-2, . . . , 410-$n$ connected in cascades, where n is an integer greater than or equal to 1. When n is greater than 1, as for 1≤i<n, an input of an i-th stage of encoding unit is an i-th stage of encoding input image and comprises $m^{i-1}$ image component, an output of the i-th encoding unit is an i-th stage of encoding output image and comprises $m^i$ image components, and the output of the i-th stage of encoding unit is an input of a (i+1)-th stage of encoding unit, where m is an integer greater than 1.

In some embodiments, each of n-stage of encoding units connected in cascades can comprise a splitting unit 412 and a transforming unit 414. That is to say, an i-th stage of encoding unit 410-$i$ comprises a splitting unit 412-$i$ and a transforming unit 414-$i$. The splitting unit 412-$i$ is used to perform a splitting operation on each of received $m^{i-1}$ image components of the i-stage of encoding unit, to split each image of i-th stage of encoding input images into $m^i$ image components. The transforming unit 414-$i$ is used to transform $m^i$ image components obtained by splitting through an input of the i-th stage of encoding unit, so that the image data becomes easier to be compressed.

The transform encoding unit 400 can further comprise an output terminal used to output the output image, wherein the output image comprises one image component corresponding to a reference image of an input image and $m^n-1$ image components corresponding to the input image.

The transform encoding unit is capable of performing, on the input image, transform encoding before compression, so that the transformed image has less content redundancy and is more appropriate to be compressed.

In some embodiments, the transform encoding unit 410 can further comprise a de-superimposing unit 416. The de-superimposing unit 416 is used to perform a de-superimposing operation on reference images encoded by the n-stages of encoding units connected in cascades and $m^n-1$ image components, so as to further reduce redundancy in the images, i.e., enabling the image data to have more zeros. The de-superimposing unit 416 is optional. That is to say, the output of the transform encoding unit 410 can be directly input to a quantizing unit 420 to perform a quantization operation.

In some embodiments, the image encoding apparatus 400 can further comprise the quantizing unit 420. The quantizing unit 420 is used to perform a quantization operation on the image data. The quantizing unit 420 can convert the image data output by the transform encoding module 410 from a floating-point number into bit streams (for example, using bit streams with a specific bit integer such as 8-bit integer or 4-bit integer).

In some embodiments, the quantizing unit 420 can perform a quantization operation on all the image components output by the transform encoding unit 410 by adopting the following quantization function $SOFT_{Q(Fi)}$:

$$SOFT_{Q(F_j)} = \frac{1}{2} + \frac{1}{2L_j} \sum_{i=1}^{L_j} \tanh\left(a_j L_j \left(F_j + \frac{1}{2L_j} - \frac{i}{L_j}\right)\right)$$

$a_j$ and $L_j$ are parameters fixed for each channel of each image component, where $L_j$ is a quantity representing a quantization level, for example, for an 8-bit quantization operation, $L_j$ is equal to 255. $a_j$ is a hardness parameter, and the smaller the $a_j$ is, the smoother the curve would be.

Figure 5A:
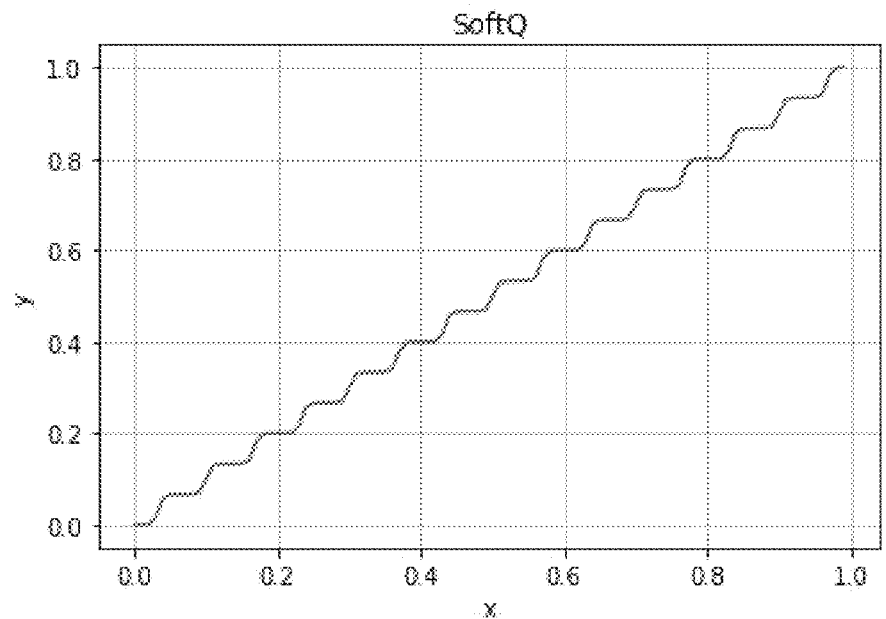
FIG. 5A shows a feature curve of a quantification function according to some embodiments of the present disclosure.
Figure 5B:
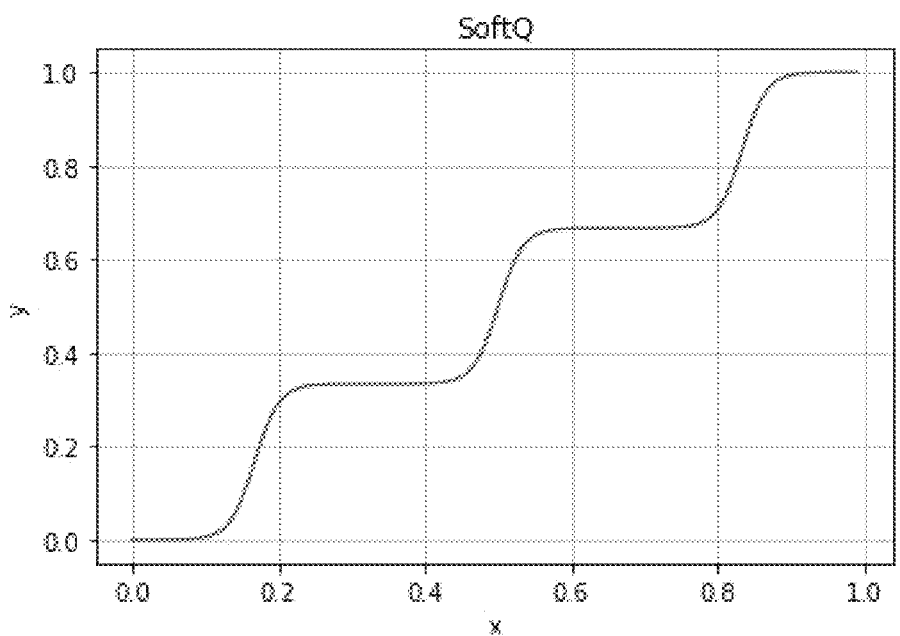
FIG. 5B shows a feature curve of a quantification function according to some embodiments of the present disclosure.

FIGS. 5A and 5B show a nature of the quantization function $SOFT_Q$ when $a_j$ and $L_j$ have different values. Herein, FIG. 5A shows a feature curve of the quantization function $SOFT_Q$ in the case of a=10, L=16. FIG. 5B shows a feature curve of the quantization function $SOFT_Q$ in the case of a=10, L=4.

The above quantization operation would loss a part of image information to some extent. When parameters of the image compression apparatus are configured, the influence produced by the quantization operation can be reduced by decreasing quadratic mean deviation of a quantized restored image, through a training method introduced in the following text.

Figure 6:
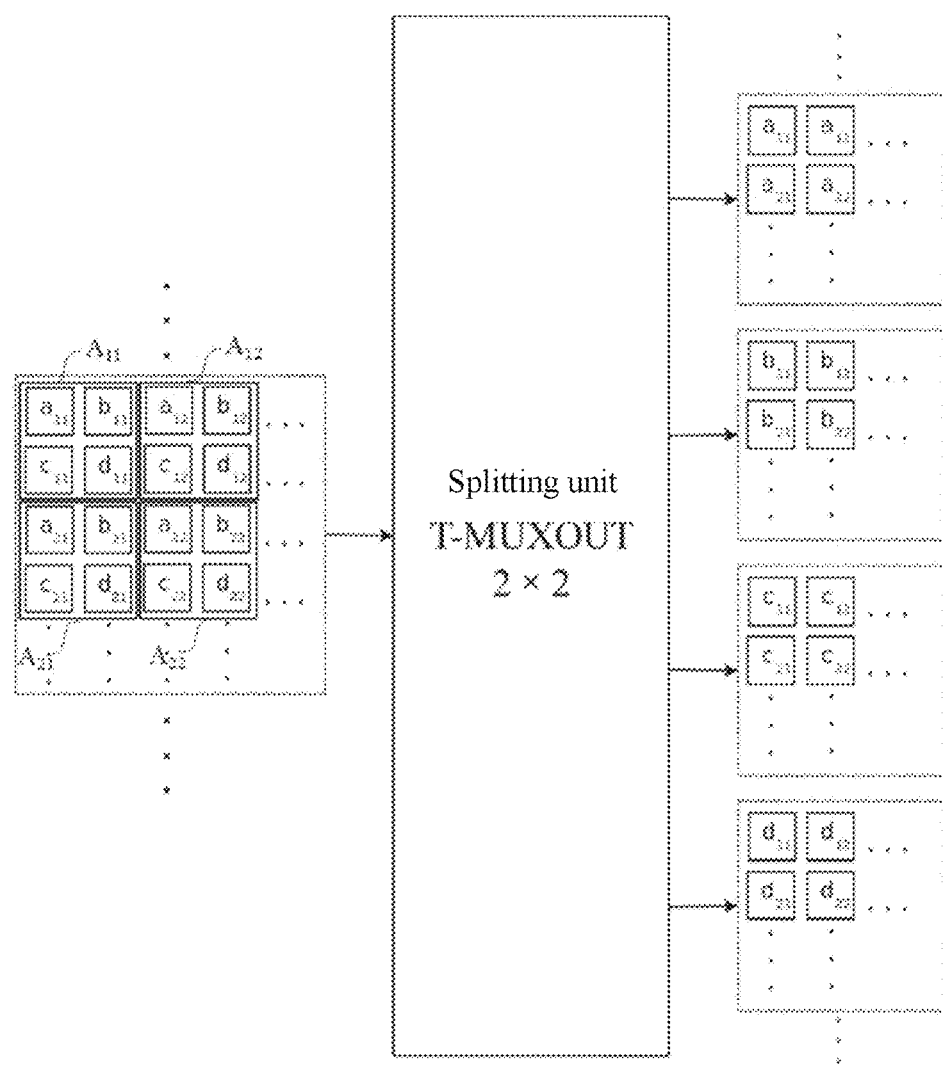
FIG. 6 shows a schematic diagram of a splitting unit according to some embodiments of the present application.

FIG. 6 illustrates a schematic diagram of a splitting unit according to some embodiments of the present disclosure. The splitting unit 412 can split an image into a plurality of small images with a lower resolution without losing any image pixel information.

FIG. 6 illustratively shows a splitting unit 412 which is capable of splitting one image into 4 small images with a lower resolution. As shown in FIG. 6, a splitting unit T-MUXOUT 2×2 divides the original image by taking 2×2 basic pixel matrixes as a unit, wherein each basic pixel matrix includes 4 original pixels. The splitting unit 412 further extracts all split pixels at a specific position of the 2×2 basic pixel matrixes, and determines split images according to pixels at specific positions in each basic pixel matrix. For example, as shown in FIG. 6, an input image of the splitting unit 412 comprises 16 original elements, and the splitting unit 412 divides the input image into basic pixel matrixes $A_{11}$, $A_{12}$, $A_{21}$, $A_{22}$, wherein the basic pixel matrix $A_{11}$ comprises pixels $a_{11}$, $b_{11}$, $c_{11}$, $d_{11}$, the basic pixel matrix $A_{12}$ comprises pixels $a_{12}$, $b_{12}$, $c_{12}$, $d_{12}$, the basic pixel matrix $A_{21}$ comprises pixels $a_{21}$, $b_{21}$, $c_{21}$, $d_{21}$, the basic pixel matrix $A_{22}$ comprises pixels $a_{22}$, $b_{22}$, $c_{22}$, $d_{22}$. The splitting unit 412 can arrange the extracted pixels in a sequence of pixels arranged in the image before the image is split, by extracting original pixels at upper-left (i.e., at a position of [1, 1]) of all the basic pixel matrixes, to generate the first piece of low-resolution split image. Similarly, the splitting unit can generate other 3 pieces of small low-resolution split images.

It could be understood that the splitting unit as shown in FIG. 6 can split an image of any random size into 4 small images with a lower resolution. In some embodiments, sizes of a plurality of low-resolution split images are equal. For example, the splitting unit 412 as shown in FIG. 6 can split an image with an original size 128×128 into 4 low-resolution images with a size 64×64.

It could be understood that the splitting unit as shown in FIG. 6 is just one example of the splitting unit according to the principle of the present application. In fact, the image can be split into a plurality of small images with a lower resolution by adjusting the size and shape of the divided basic pixel matrixes. For example, when the size of the basic pixel matrix is 3×3, the splitting unit can split the input image into 3×3=9 small images with a lower resolution. For another example, when the size of the basic pixel matrix is 3×4, the splitting unit can split the input image into 3×4=12 small images with a lower resolution. That is to say, when the size of the basic pixel matrix is a×b, the splitting unit can split the input image into a×b=c small images with a lower resolution. Those skilled in the art can know that the splitting unit 412 can split one image into random small images with a lower resolution according to the principle of the present application.

It could be understood that FIG. 6 shows a schematic diagram of splitting two-dimensional image data by utilizing the splitting unit. According to the principle of the present application, the splitting unit 412 can split any other dimensional (such as, one-dimensional, three-dimensional, etc.) image data.

For the purpose of convenient description, description is given in the following text by taking the splitting unit as shown in FIG. 6 as an example, and the four low-resolution split images are referred to as upper-left (UL), upper-right (UR), bottom-right (BR) and bottom-left (BL) respectively. That is to say, for the i-th stage of encoding unit, the input image comprises $4^{i-1}$ image components, and an i-th stage of input is split into $4^i$ image components via a splitting unit 412-$i$ in the i-th stage of encoding unit.

Figure 7:
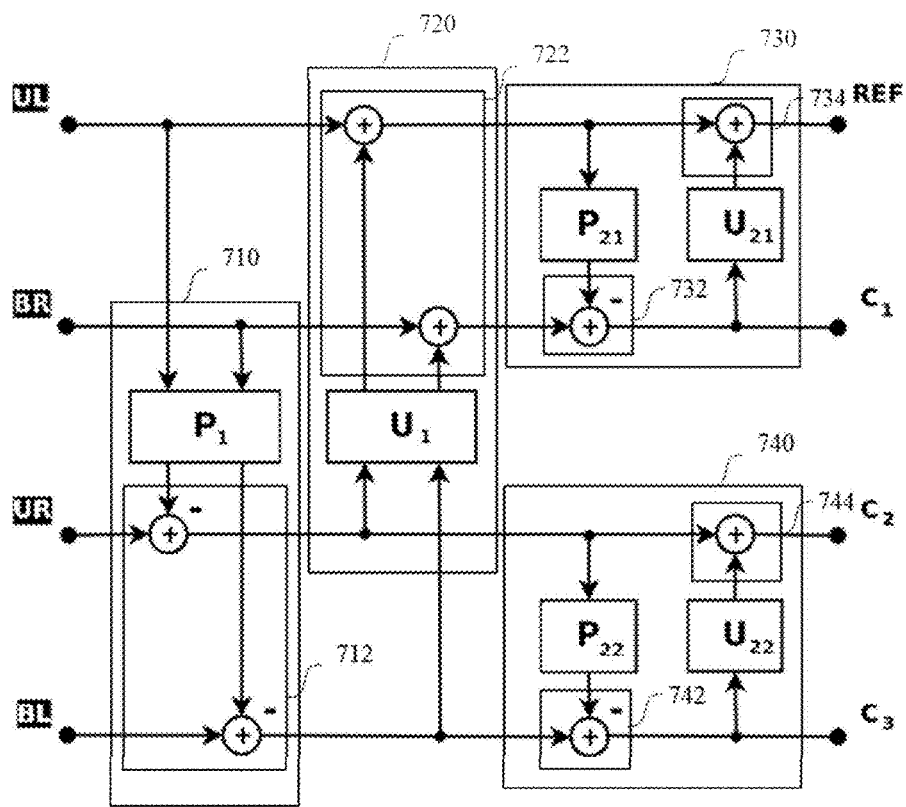
FIG. 7 shows a schematic diagram of a transforming unit according to some embodiments of the present disclosure.

FIG. 7 shows a schematic diagram of a transforming unit 414 according to some embodiments of the present disclosure. As described above, the splitting unit can split the original image into 4 low-resolution images UL, UR, BL and BR. The transforming unit 414 can transform the above four low-resolution images UL, UR, BL and BR, so that the image data is more appropriate to be compressed.

The transforming unit 414 can comprise: a first prediction unit 710, configured to generate a predicted image relating to the images UR and BL based on the image UL and the image BR and obtain a difference image between the image UR, the image BL and the predicted image; a first updating unit 720, configured to generate an updated image relating to the image UL and the image BR based on the difference image between the image UR, the image BL and the predicted image; a first wavelet transforming unit 730, configured to perform a wavelet transform based on the updated image relating to the image UL and the image BR, and generate a first encoding output component and a second encoding output component based on a result of the wavelet transform; a second wavelet transforming unit 740, configured to perform a wavelet transform based on the difference image between the image UR, the image BL and the predicted image, and generate a third encoding output component and a fourth encoding output component based on a result of the wavelet transform.

In some embodiments, the first prediction unit 710 can further comprise a first prediction convolutional network $P_1$ and a first de-superimposing unit 712. The first prediction convolutional network $P_1$ is configured to receive the image UL and the image UR as an input and generate a first prediction feature and a second prediction feature used for the image UR and the image BL. The first prediction feature and the second prediction feature may be the same or may be different. The first de-superimposing unit 712 is configured to perform a de-superimposing operation (i.e., image subtraction) on the image UR and the first prediction feature to obtain a first difference feature, and perform a de-superimposing operation on the image BL and the second prediction feature to obtain a second difference feature.

In some embodiments, the first updating unit 720 can further comprise a first updating convolutional network $U_1$ and a first superimposing unit 722. The first updating convolutional network $U_1$ is configured to receive the first difference feature and the second difference feature as an input and generate a first updating feature and a second updating feature relating to the first difference feature and the second difference feature. The first updating feature and the second updating feature may be the same, or may be different. The first superimposing unit 722 is configured to perform an superimposing operation on the image UL and the first updating feature to obtain a first superimposing feature and perform an superimposing operation on the image BR and the second updating feature to obtain a second superimposing feature.

In some embodiments, the first wavelet transforming unit 730 can further comprise a second prediction convolutional network $P_{21}$, configured to receive the first superimposing feature as an input, and generate a third prediction feature relating to the first superimposing feature; a second de-superimposing unit 732, configured to perform a de-superimposing operation on the second superimposing feature and the third prediction feature to obtain a second encoding output component; a second updating convolutional network $U_{21}$, configured to receive the second encoding output component as an input and generate a third updating feature relating to the second encoding output component; a second superimposing unit 734, configured to perform superimposing operation on the first superimposing feature and the third updating feature to obtain the first encoding output component.

In some embodiments, the second wavelet transforming unit 740 can further comprise a third prediction convolutional network $P_{22}$, configured to receive the first difference feature as an input and generate a fourth prediction feature relating to the first difference feature; a third de-superimposing unit 742, configured to perform de-superimposing operation on the second difference feature and the fourth prediction feature to obtain a fourth encoding output component; a third updating convolutional network $U_{22}$, configured to receive the fourth encoding output component as an input and generate a fourth updating feature relating to the fourth encoding output component; a third superimposing unit 614, configured to perform an superimposing operation on the first difference feature and the fourth updating feature to obtain a third encoding output component.

The structure as shown in FIG. 7 is non-limited. For example, the structures of the first prediction unit 710 and the first updating unit 720 can be exchanged in the transforming unit 414.

Image transform can be performed on low-resolution split images by utilizing the image processing device as shown in FIG. 7, so that the image data is converted into a form being more suitable to be compressed. Image information does not loss in the image transform herein, because the image information can be restored without any loss through a corresponding inverse transform.

Figure 8:
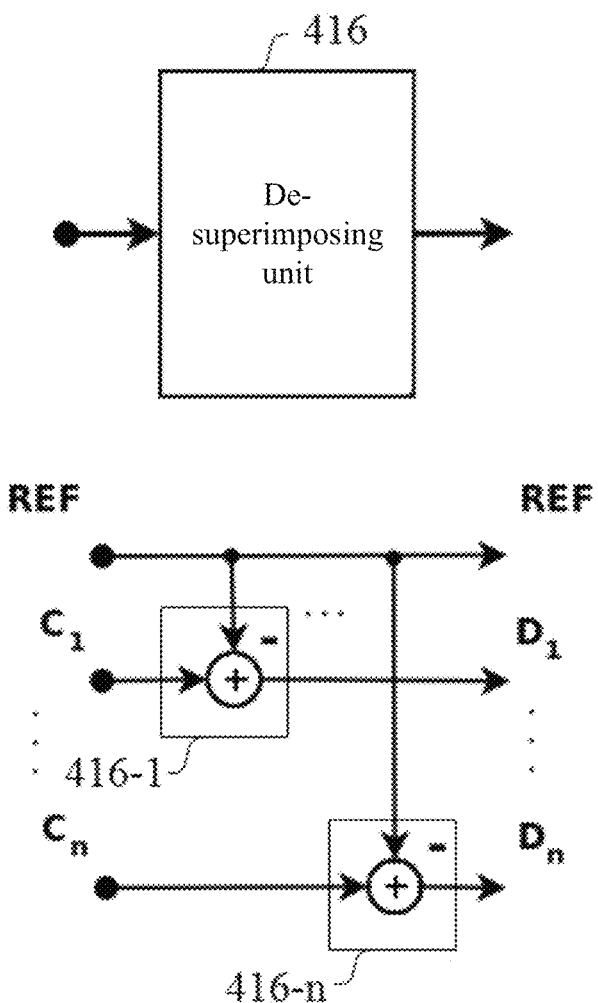
FIG. 8 shows a schematic diagram of a de-superimposing unit according to some embodiments of the present disclosure.

FIG. 8 shows a schematic diagram of a de-superimposing unit 416 according to some embodiments of the present disclosure. As shown in FIG. 7, the de-superimposing unit 416 comprises a plurality of de-superimposing sub-units 461-1 . . . 416-n. The de-superimposing unit 416 receives one reference image REF output from a last stage of encoding unit and n image components. For a first image component $C_1$, the de-superimposing sub-unit 416-1 performs a de-superimposing operation with regard to the reference image REF and the image component $C_1$, to obtain an image component $D_1$ by subtracting the reference image REF from the image component $C_1$.

The de-superimposing unit 416 as shown in FIG. 8 can further reduce redundancy in the image information, so as to further enhance compression rate.

Figure 9:
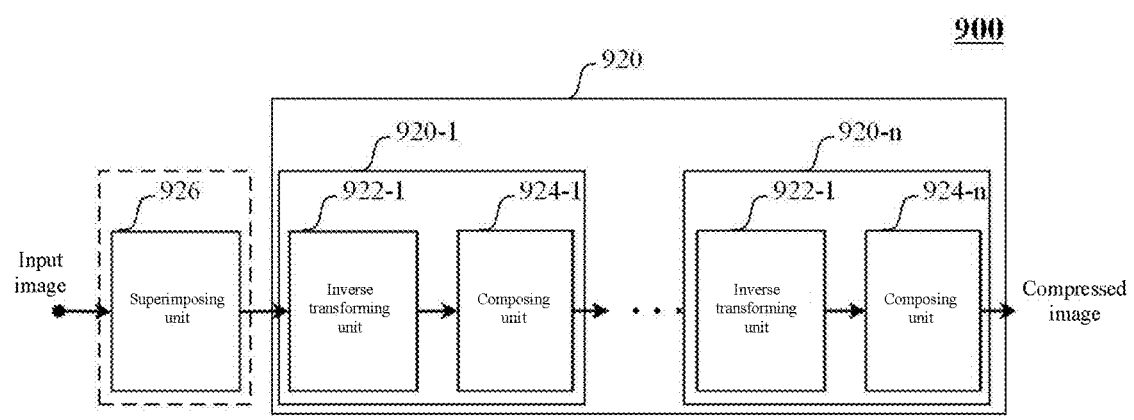
FIG. 9 shows a schematic diagram of a decompression device according to some embodiments of the present disclosure.

FIG. 9 shows a schematic diagram of a decompression device according to some embodiments of the present disclosure. A decompression device 900 can comprise a transform decoding unit 920.

The transform decoding unit 920 as shown in FIG. 9 is corresponding to the transform encoding unit as shown in FIG. 4, and is capable of restoring the image data transformed via the transform encoding unit 410 to the original data without any loss.

The transform decoding unit 920 can comprise an input terminal used to receive a compressed image, the compressed image including one reference image and $m^n-1$ image components, where m is an integer greater than 1, and n is an integer greater than or equal to 1. Herein, the reference image and each image component of the $m^n-1$ image components can comprise multiple channels (such as three channels RGB).

The transform decoding unit 910 can further comprise n stages of decoding units 920-1, 920-2 . . . 920-n connected in cascades. When n>1, as for $1 \le i < n$, an input of an i-th stage of decoding unit is an i-th stage of decoding input image and comprises $m^i$ image components, an output of the i-th stage of decoding unit is an i-th stage of decoding output image and comprises $m^{i-1}$ image components, and the output of the i-th stage of decoding unit is an input of a (i+1)-th stage of decoding unit.

In some embodiments, each of the n-stages of decoding unit connected in cascades can comprise an inverse transforming unit 922 and a composing unit 924. That is to say, an i-th stage of decoding unit 920-i comprises an inverse transforming unit 920-i and a composing unit 924-i. The inverse transforming unit is used to perform an inverse transform on $m^i$ image components of the input of the i-th stage of decoding unit, so as to restore the compressed image without any loss. The composing unit 924 is used to perform a composing operation on $m^i$ transformed decoding output components, so as to compose the $m^i$ image components to $m^{i-1}$ image components.

The transform decoding unit 920 can further comprise an output terminal configured to output the restored image corresponding to the compressed image.

In some embodiments, if the transform encoding unit 410 in the corresponding image compression device comprises the de-superimposing unit 416, then the transform decoding unit 920 can further comprise an superimposing unit 926.

Figure 10:
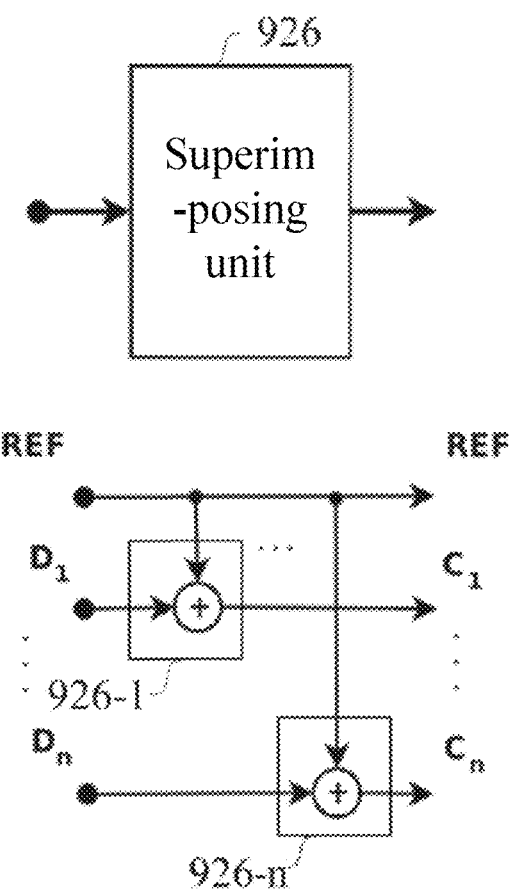
FIG. 10 shows a schematic diagram of an superimposing unit according to some embodiments of the present application.

FIG. 10 shows a schematic diagram of an superimposing unit 926 according to some embodiments of the present application. The superimposing unit 926 performs the operation corresponding to the de-superimposing unit 416. As shown in FIG. 10, the superimposing unit 926 comprises a plurality of superimposing sub-units 926-1 . . . 926-n. The de-superimposing unit 426 receives one reference image REF of the compressed image and n image components $D_1$ . . . $D_n$. As for the first image component $D_1$, the de-superimposing sub-unit 416-1 performs an superimposing operation relating to the reference image REF and the image component $D_1$, to obtain the image component $C_1$ by superimposing reference image REF in the image component $D_i$.

Figure 11:
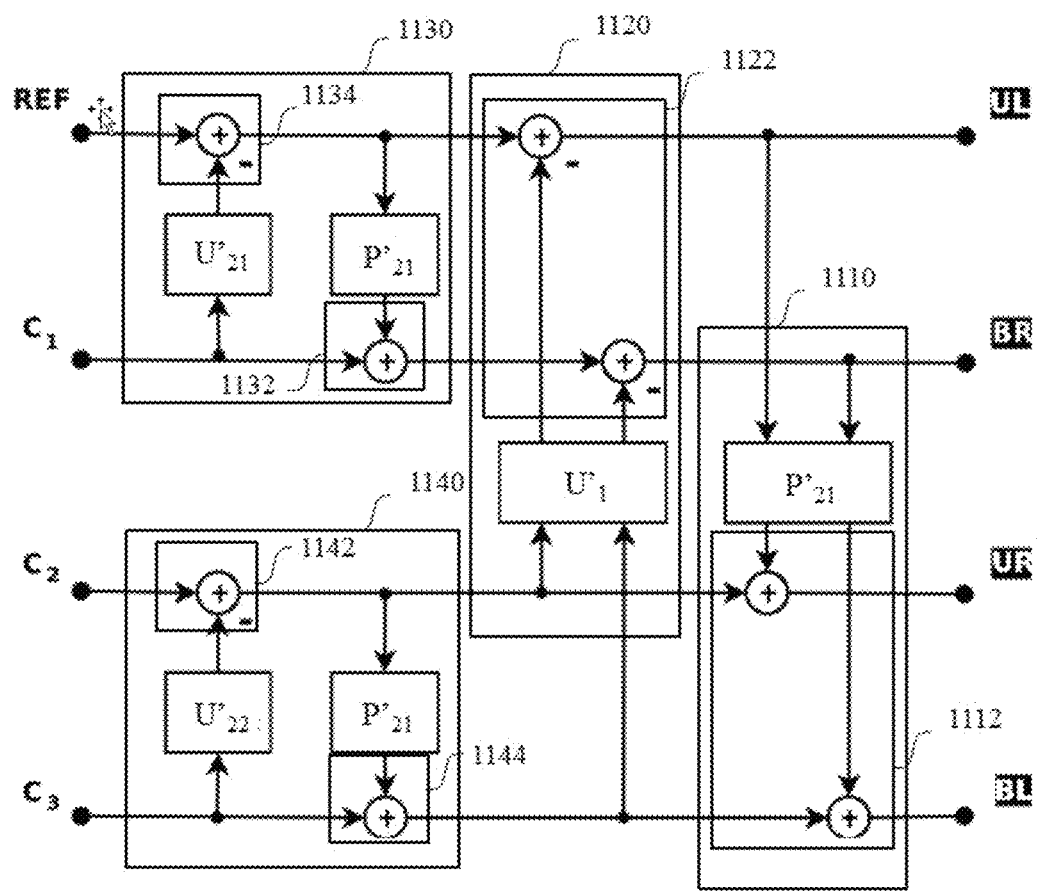
FIG. 11 shows a schematic diagram of an inverse transforming unit according to some embodiments of the present application.

FIG. 11 shows a schematic diagram of an inverse transforming unit 922 according to some embodiments of the present application. When m=4, the i-th decoding input image comprises a first decoding input component, a second decoding input component, a third decoding input component and a fourth decoding input component, wherein each decoding input component comprises $4^{i-1}$ image components.

The inverse transforming unit 922 can comprise a first inverse wavelet transforming unit 1130, configured to perform an inverse wavelet transform based on the first decoding input component and the second decoding input component and obtain a first difference feature and a first superimposing feature based on a result of the inverse wavelet transform; a second inverse wavelet transforming unit 1140, configured to perform an inverse wavelet transform based on the third decoding input component and the fourth decoding input component and obtain a second difference feature and a second superimposing feature based on a result of the inverse wavelet transform; a second updating unit 1120, configured to generate an updated image based on the second difference feature and the second superimposing feature and generate a first decoding output component and a second decoding output component based on the updated image, the first difference feature and the first superimposing feature; a second prediction unit 1110, configured to generate a predicted image based on the first decoding output component and the second decoding output component and generate a third decoding output component and a fourth decoding output component based on the predicted image, the second difference feature and the second superimposing feature.

In some embodiments, the second updating unit 1120 further comprises a first updating convolutional network $U'_1$ and a first de-superimposing unit 1122. The first updating convolutional network $U'_1$ is configured to receive the second difference feature and the second superimposing feature as an input and generate a first updating feature and a second updating feature relating to the second difference feature and the second superimposing feature. The first updating feature and the second updating feature may be the same, or may be different. The first de-superimposing unit 1122 is configured to perform a de-superimposing operation on the first difference feature and the first updating feature to obtain the first decoding output component and perform a de-superimposing operation on the first superimposing feature and the second updating feature to obtain the second decoding output component.

In some embodiments, the second prediction unit 1110 further comprises a first prediction convolutional network $P'_1$ and a first superimposing unit 1112. The first prediction convolutional network $P'_1$ is configured to receive the first decoding output component and the second decoding output component as an input and generate a first prediction feature and a second prediction feature relating to the first decoding output component and the second decoding output component. The first prediction feature and the second prediction feature may be the same, or may not be the same. The first superimposing unit 1112 is configured to perform an superimposing operation on the second difference feature and the first prediction feature to obtain a third decoding output component and perform an superimposing operation on the second superimposing feature and the second prediction feature to obtain a fourth decoding output component.

In some embodiments, the first inverse wavelet transforming unit 1130 can further comprise a second updating convolutional network $U'_{21}$, configured to receive the second decoding input component as an input and generate a third updating feature relating to the second decoding input component; a second de-superimposing unit 1134, configured to perform a de-superimposing operation on the first decoding input component and the third updating feature to obtain a first difference feature; a second prediction convolutional network $P'_{21}$, configured to receive the first difference feature as an input and generate a second prediction feature relating to the first difference feature; a second superimposing unit 1132, configured to perform an superimposing operation on the second decoding input component and the third prediction feature to obtain a first superimposing feature.

In some embodiments, the second inverse wavelet transforming unit 1140 can further comprise a third updating convolutional network $U'_{22}$, configured to receive the fourth decoding input component as an input and generate a fourth updating feature relating to a fourth image decoding input; a third de-superimposing unit 1142, configured to perform a de-superimposing operation on the third decoding input component and the fourth updating feature to obtain a second difference feature; a third prediction convolutional network $P'_{22}$, configured to receive the second difference feature as an input and generate a fourth prediction feature relating to the second difference feature; a third superimposing unit 1144, configured to perform an superimposing operation on the fourth decoding input component and the fourth prediction feature to obtain a second superimposing feature.

Since the inverse transforming unit 922 is used to restore the image processed by the transforming unit 422, in some embodiments, the convolutional network in the inverse transforming unit 922 is completely corresponding to the convolutional network in the transforming unit 422. That is to say, the first prediction convolutional network $P'_1$, the first updating convolutional network $U'_1$, the second updating convolutional network $U'_{21}$, the second prediction convolutional network $P'_{21}$, the third updating convolutional network $U'_{22}$, the third prediction convolutional network $P'_{22}$ in the inverse transforming unit 922 have structures ad configuration parameters as the same as the first prediction convolutional network $P_1$, the first updating convolutional network $U_1$, the second updating convolutional network $U_{21}$, the second prediction convolutional network $P_{21}$, the third updating convolutional network $U_{22}$, the third prediction convolutional network $P_{22}$ in the transforming unit 422.

The structure as shown in FIG. 1 is non-limited. For example, structures of the second prediction unit 1110 and the second updating unit 1120 in the inverse transforming unit 922 can be exchanged.

Figure 12:
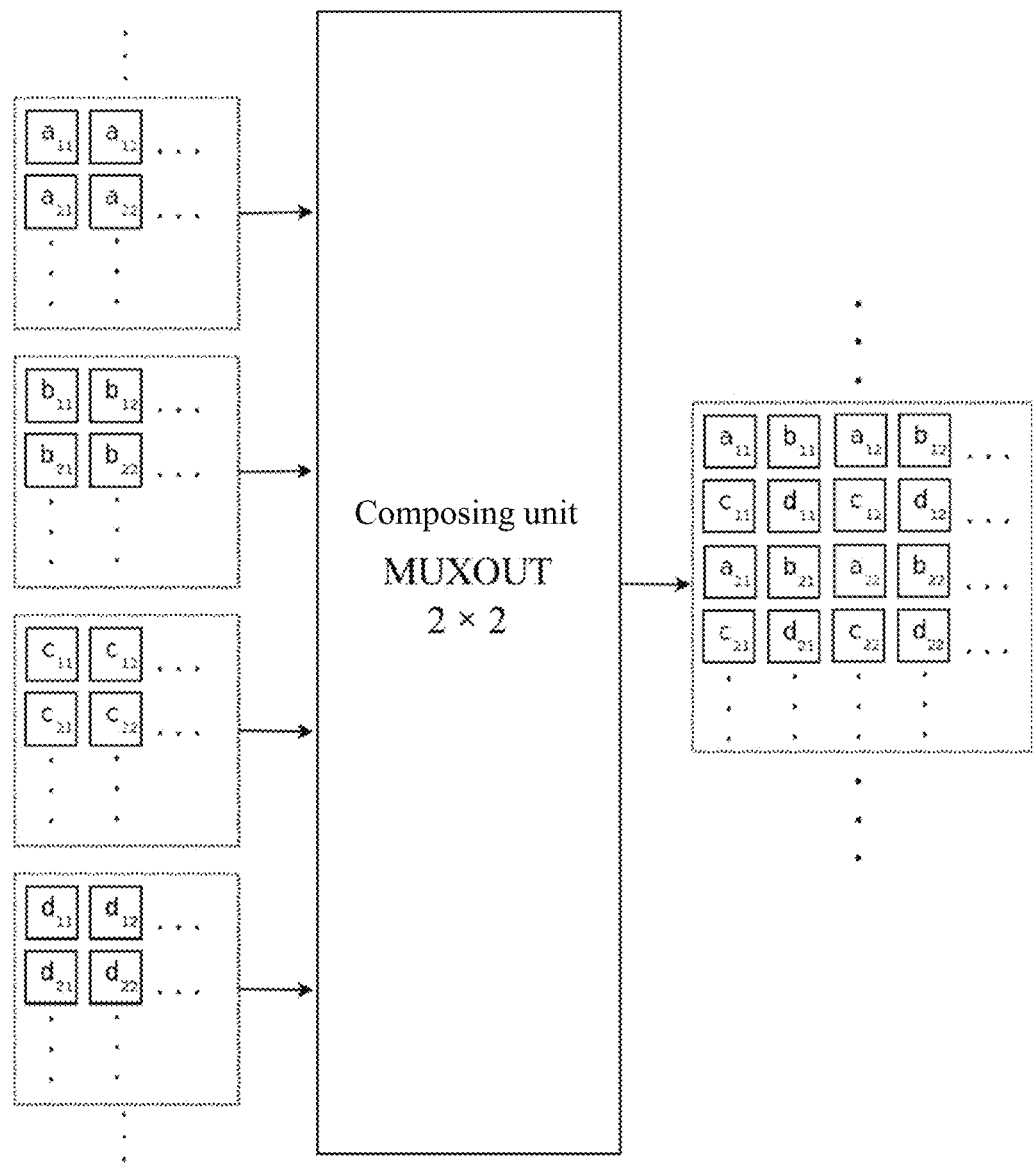
FIG. 12 shows a schematic diagram of a composing unit according to some embodiments of the present application.

FIG. 12 shows a schematic diagram of a composing unit according to some embodiments of the present disclosure. The composing unit can compose a plurality of small low-resolution images to a composite image with a higher resolution. The composing unit is configured to perform inverse transform of the splitting unit as described above, so as to restore the small low-resolution split images to original high-resolution images.

Figure 13:
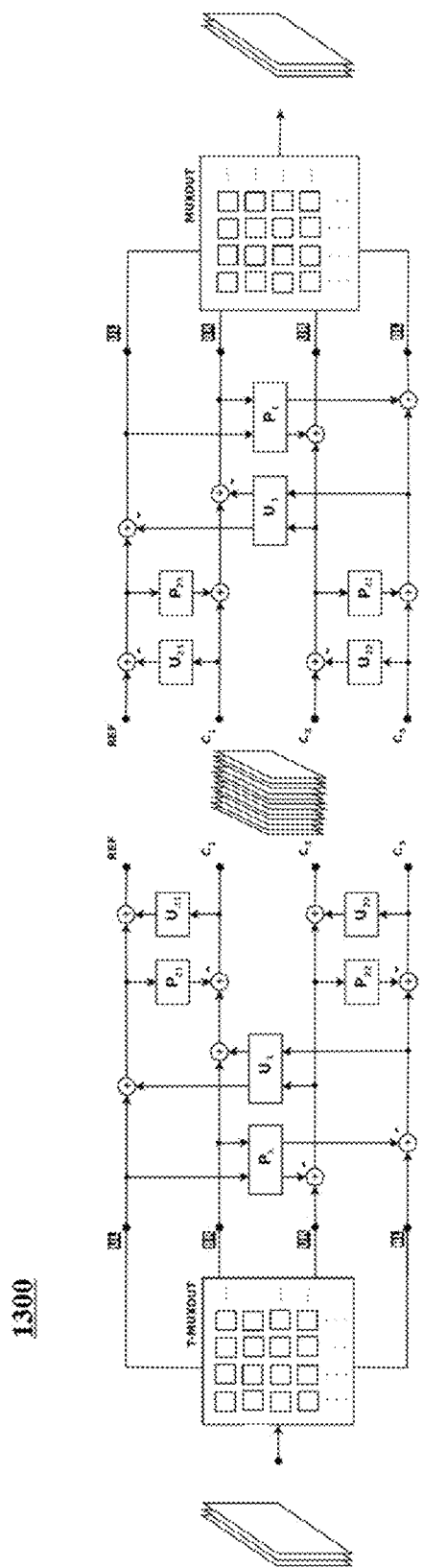
FIG. 13 schematically shows a process of transform encoding and transform decoding an image.

FIG. 13 schematically shows a process of transform encoding and transform decoding an image. An input image is received at an input terminal of the transform encoding unit. As shown in FIG. 13, the input image can comprise a plurality of random channels, for example, three channels RGB. After processing of the first stage of transform decoding unit, the input image is split by the splitting unit into four sub-images with a lower resolution. As described above, the input image can be split into a plurality of random sub-images. Image transform is performed on the split sub-images through the transforming unit, so that the image data becomes more suitable to be compressed. It can be seen that as for the input image including multiple channels, each arrow of the first stage of transform encoding unit as shown in FIG. 13 can process data of multiple channels. For example, as for the input image including 3 channels RGB, each arrow in the first stage of transform encoding unit can process data of three channels. After processing of the first stage of transform encoding unit, the input image is transformed into four image components, wherein a first image component is a reference image of the input image, i.e., including most image information of the input image, while second, third, fourth image components include other detail information of the input image. Compare with the reference image, pixel information of the remaining image components is close to zero.

According to the actual requirement for image processing, the image can be processed by using multi-stage transform encoding units. For example, after processing of n stages of transform encoding units, the input image as shown in FIG. 13 can obtain $4^n$ image components, wherein the first image component is a reference image including most information of the input image, while the remaining image components are image components including the detail information. Compared with the reference image, the pixel information of the remaining image component is close to zero.

Additionally, since each stage of transform encoding unit splits the input image into more low-resolution sub-images, each stage of transform encoding unit can have more channels than a previous stage of transform encoding unit. For example, as for the input image as shown in FIG. 13, each arrow in the first stage of transform encoding unit can process data of 3 channels, each arrow in the second stage of transform encoding unit can process data of 12 channels, and so on and so forth, and each arrow of the n-th stage of transform encoding unit can process data of $3*4^{n-1}$ channels.

The image transform encoding process as described above is invertible. Corresponding to the n-th stage of transform encoding unit, the n-th stage of transform decoding unit having the same configurations can restore the input image without losing any image information. Each stage of transform decoding unit is used to perform inverse transform on a plurality of image components of the input, perform a composing operation on the transformed image component, and restore the image components to image components with a higher resolution. Corresponding to the encoding process, after processing of the same stages of decoding processes, a plurality of image components can be restored to original input images. No further detains are given herein.

FIG. 14 shows a flow diagram of an image compression method according to some embodiments of the present disclosure. An image compression method 1400 can be performed by utilizing the image compression device as shown in FIG. 4. For example, the image compression device can comprise at least one processor, which can be configured to perform the image compression method 1400. In step S1402, an input image is received. Then, in step S1404, image encoding is performed on the input image by utilizing the n stages of encoding units connected in cascades to produce an output image, where n is an integer greater than or equal to 1. When n is greater than 1, as for $1 \leq i < n$, an input of an i-th stage of encoding unit is an i-th stage of encoding input image and comprises $m^{i-1}$ image components, an output of the i-th encoding unit is an i-th stage of encoding output image and comprises $m^i$ image components, and the output of the i-th stage of encoding unit is an input of a (i+1)-th stage of encoding unit, where m is an integer greater than 1.

The image compression method 1400 can further comprise: in step S1406, performing a de-superimposing operation on $m^n-1$ image components corresponding to the input image and the reference image, to obtain a difference image of the $m^n-1$ image components and the reference image.

The image compression method 1400 can further comprise: in step S1408, performing a quantization operation on the reference image and the $m^n-1$ image components.

In some embodiments, the image compression method 1400 can omit a step S1406, i.e., directly performing a quantization operation on the input image after encoding of the input image is completed.

The above image compression method is capable of improving the transform encoding process of the input image before the input image is compressed, so that the transformed image has less content redundancy, and is more suitable to be compressed.

Figure 15:
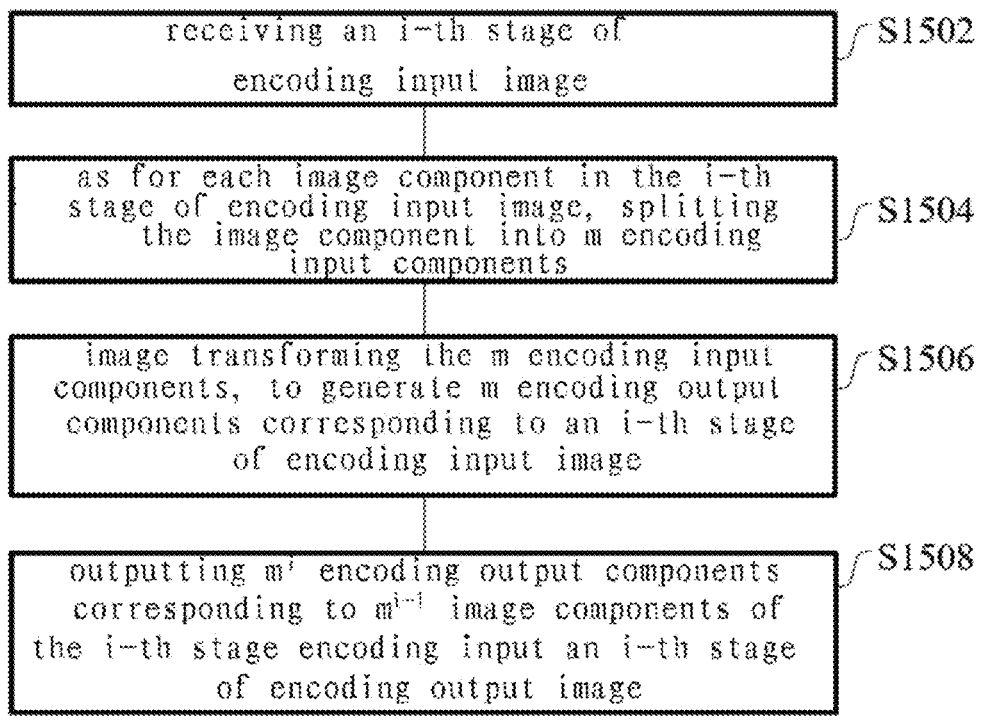
FIG. 15 shows a flow diagram of an image encoding process of an i-th stage of transform encoding unit according to some embodiments of the present application.

FIG. 15 shows a flow diagram of an image encoding process of the i-th stage of transform encoding unit according to some embodiments of the present application. An image encoding process 1500 can be performed by utilizing the transform encoding unit 410-$i$ as shown in FIG. 4. In step S1502, an i-th stage of encoding input image is received. In step S1504, as for each image component in the i-th stage of encoding input image, the image component is split into m encoding input components. In step S1506, as for each image component in the i-th stage of encoding input image, image transform is performed on m encoding input components obtained by splitting the image components, to generate m encoding output components corresponding to the image component. In step S1508, $m^i$ encoding output components corresponding to $m^{i-1}$ image components of the i-th stage encoding input are output as an i-th stage of encoding output image.

FIG. 16 shows a flow diagram of an image transform process in the i-th stage of transform encoding unit according to some embodiments of the present disclosure when m=4. An image transform process 1600 can be performed by using the transform 414 as shown in FIG. 4 or FIG. 7.

When m=4, each image component in the i-th stage of encoding input image is split into a first encoding input component, a second encoding input component, a third encoding input component and a fourth encoding input component. Therefore, in step S1602, the transforming unit 414 receives the first encoding input component, the second encoding input component, the third encoding input component and the fourth encoding input component. In step S1604, a predicted image is generated based on the first encoding input component and the second encoding input component, and a difference image of the third encoding input component and the fourth encoding input component, and the predicted image is obtained.

Figure 17A:
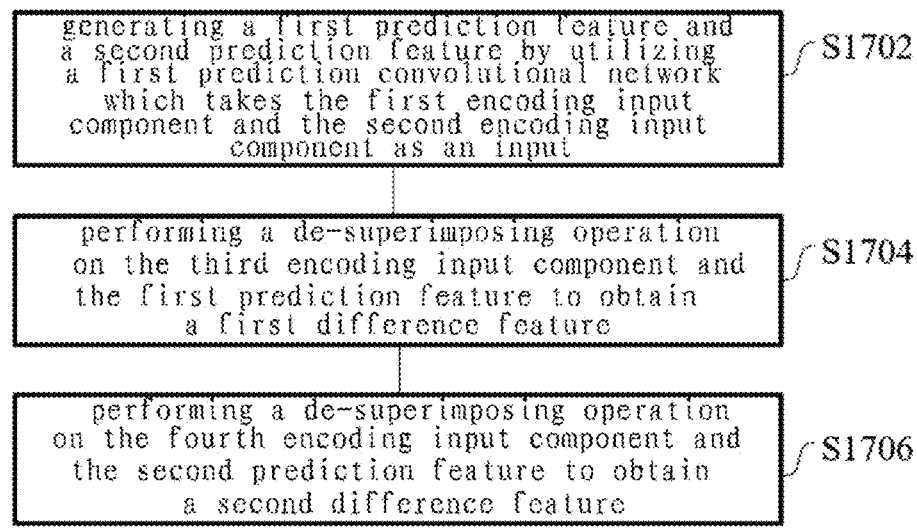
FIG. 17A shows a flow diagram of an image transform process of an i-th stage of transform encoding unit according to some embodiments of the present application.

Herein, as shown in FIG. 17A, the step S1604 can further comprise: in step S1702, generating a first prediction feature and a second prediction feature by utilizing a first prediction convolutional network $P_1$ which takes the first encoding input component and the second encoding input component as an input, where the first prediction feature and the second prediction feature may be the same, or may be different; in step S1704, performing a de-superimposing operation on the third encoding input component and the first prediction feature to obtain a first difference feature; in step S1706, performing a de-superimposing operation on the fourth encoding input component and the second prediction feature to obtain a second difference feature. Herein, the difference image of the third encoding input component and the fourth encoding input component, and the predicted image includes the first difference feature and the second difference feature.

In step S1606, updated images of the first encoding input component and the second encoding input component are generated based on the difference image, the first encoding input component and the second encoding input component.

Figure 17B:
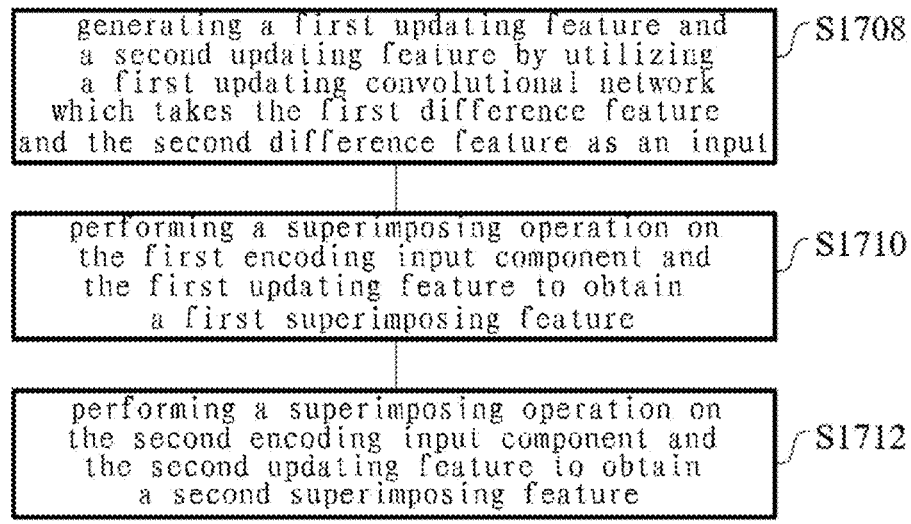
FIG. 17B shows a flow diagram of an image transform process of an i-th stage of transform encoding unit according to some embodiments of the present application.

Herein, as shown in FIG. 17B, the step S1604 can further comprise: in step S1708, generating a first updating feature and a second updating feature by utilizing a first updating convolutional network $U_1$ which takes the first difference feature and the second difference feature as an input, wherein the first updating feature and the second updating feature may be the same, or may be different; in step S1710, performing an superimposing operation on the first encoding input component and the first updating feature to obtain a first superimposing feature; in step S1712, performing an superimposing operation on the second encoding input component and the second updating feature to obtain a second superimposing feature.

In step S1608, a wavelet transform is performed based on an updated image, and a first encoding output component and a second encoding output component are generated based on a result of the wavelet transform.

In step S1610, a wavelet transform is performed based on a difference image, and a third encoding output component and a fourth encoding output component are generated based on a result of the wavelet transform.

FIG. 18 shows a flow diagram of a wavelet transform based on the updated image according to some embodiments of the present application. A wavelet transform 1800 based on the updated image can be performed by utilizing the first wavelet transform 730 as shown in FIG. 7. In step S1802, the third prediction feature relating to the first superimposing feature is generated by utilizing the second prediction convolutional network $P_{21}$ which takes the first superimposing feature as an input. In step S1804, a de-superimposing operation is performed on the second superimposing feature and the third prediction feature to obtain the second encoding output component. In step S1806, the third updating feature relating to the second encoding output component is generated by utilizing the second updating convolutional network $U_{21}$ which takes the second encoding output component as an input. In step S1808, an superimposing operation is performed on the first superimposing feature and the third updating feature to obtain the first encoding output component.

FIG. 19 shows a flow diagram of the wavelet transform based on the difference image according to some embodiments of the present disclosure. A wavelet transform 1900 based on the difference image can be performed by utilizing the second wavelet transforming unit 740 as shown in FIG. 7. In step S1902, the fourth prediction feature is generated by utilizing the third prediction convolutional network $P_{22}$ which takes the first difference feature as an input. In step S1904, a de-superimposing operation is performed on the second difference feature and the fourth prediction feature to obtain the fourth encoding output component. In step S1906, the fourth updating feature is generated by utilizing the third updating convolutional network $U_{22}$ which takes the fourth encoding output component as an input. In step S1908, an superimposing operation is performed on the first difference feature and the fourth updating feature to obtain the third encoding output component.

The image compression method provided according to some embodiments of the present application can reduce content redundancy in the image, and thus improve compression rate of the image.

FIG. 20 shows a flow diagram of an image decompression method according to some embodiments of the present application. An image decompression method 2000 can be performed by utilizing the image decompression device as shown in FIG. 9. For example, the image decompression device can comprise at least one processor, which can be configured to perform the image decompression method 2000. In step S2002, a compressed image is received, the compressed image including one image component as the reference image and $m^n-1$ image components. In step S2004, an superimposing operation is performed on the $m^n-1$ image components and the reference image, to obtain superimposed images of the $m^n-1$ image components and the reference image. In step S2006, image decoding is performed on the compressed image by utilizing the n stages of decoding units connected in cascades to generate a restored image. When n is greater than 1, as for $1 \leq i < n$, the input of the i-th stage of decoding unit is the i-th stage of decoding input image and comprises $m^i$ image components, the output of the i-stage of decoding unit is the i-th stage of decoding output image and comprises $m^{i-1}$ image components, and the output of the i-th stage of decoding unit is the input of the (i+1)-th stage of decoding unit. In step S2008, the restored image corresponding to the compressed image is output.

In order to restore the compressed image without any loss, the image decompression method 2000 is corresponding to the image compression method 1400. That is to say, for example, when the step S1408 of performing a de-superimposing operation is omitted in the image compression method 1400, the image decompression method 2000 also omit the step S2004 of performing an superimposing operation correspondingly.

Figure 21:
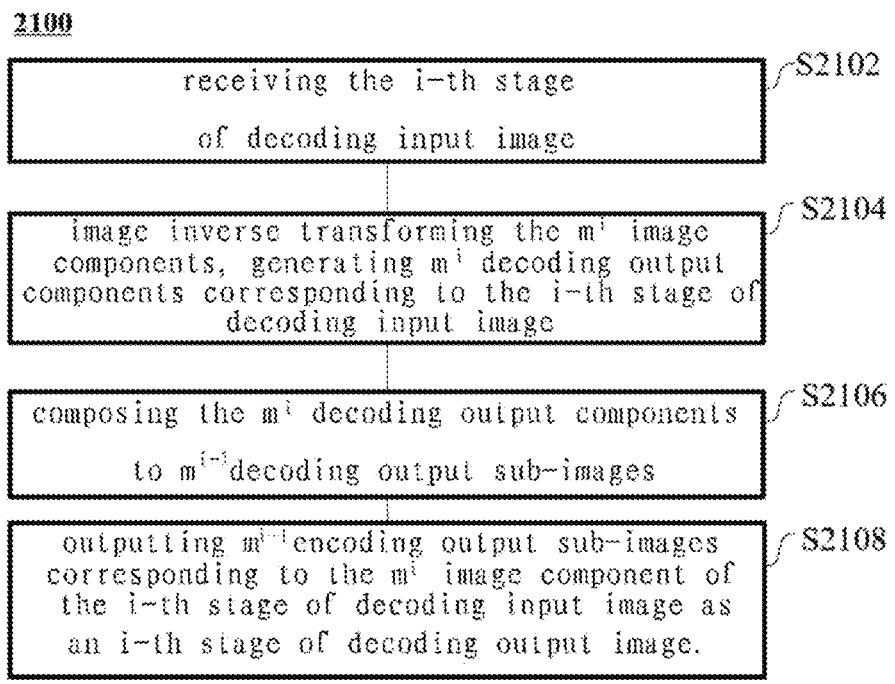
FIG. 21 shows a flow diagram of an image decoding method of an i-th stage of transform decoding unit according to some embodiments of the present application.

FIG. 21 shows a flow diagram of an image decoding method of the i-th stage of transform decoding unit according to some embodiments of the present disclosure. An image decoding method 2100 can be performed by utilizing the transform decoding unit 910 as shown in FIG. 9. In step S2102, the i-th stage of decoding input image is received, wherein the i-th stage of input image comprises $m^i$ input sub-images. In step S2104, image inverse transform is performed on the $m^i$ image components, to generate $m^i$ decoding output components corresponding to the i-th stage of decoding input image. In step S2106, the $m^i$ decoding output components are composed to $m^{i-1}$ decoding output sub-images. In step S2108, $m^{i-1}$ decoding output sub-images corresponding to the $m^i$ image components of the i-th stage of decoding input images are output as the i-th stage of decoding output image.

FIG. 22 shows a flow diagram of an image inverse transform method according to some embodiments of the present disclosure when m=4. An image inverse transform method 2200 can be performed by utilizing the inverse transforming unit 922 as shown in FIG. 9 or FIG. 11. In step S2202, the inverse transforming unit 922 receives the first decoding input component, the second decoding input component, the third decoding input component and the fourth decoding input component. In step 2204, an inverse wavelet transform is performed based on the first decoding input component and the second decoding input component, and the first difference feature and the first superimposing feature are obtained based on the result of the inverse wavelet transform. In step S2206, an inverse wavelet transform based on the third decoding input component and the fourth decoding input component is performed, and the second difference feature and the second superimposing feature are obtained based on the result of the inverse wavelet transform.

In step S2208, the updated image is generated based on the second difference feature and the second superimposing feature, and the first decoding output component and the second decoding output component are generated based on the updated image, the first difference feature and the first superimposing feature.

Figure 23A:
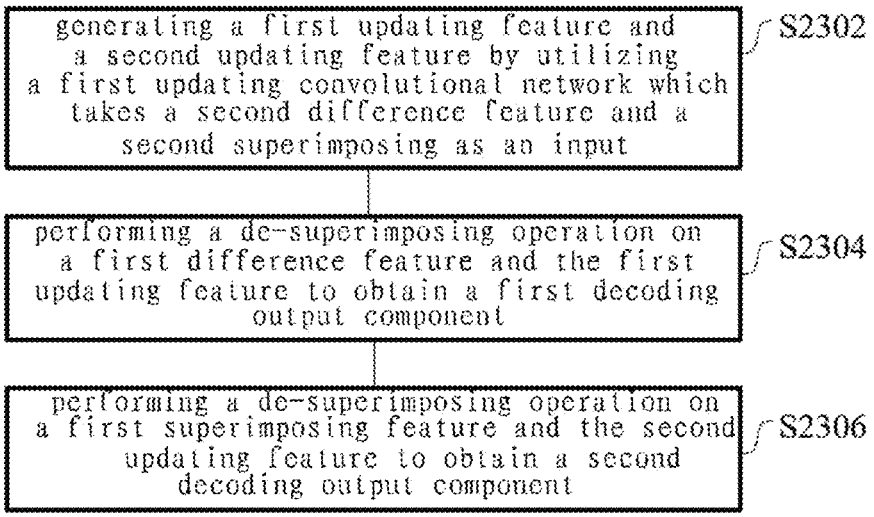
FIG. 23A shows a flow diagram of an image decoding method of an i-th stage of transform decoding unit according to some embodiments of the present application.

As shown in FIG. 23A, the step S2208 can further comprise: in step S2302, generating the first updating feature and the second updating feature by utilizing the first updating convolutional network U'i which takes the second difference feature and the second superimposing feature as an input. The first updating feature and the second updating feature may be the same, or may be different. In step S2504, a de-superimposing operation is performed on the first difference feature and the first updating feature to obtain the first decoding output component. In step S2506, a de-superimposing operation is performed on the first superimposing feature and the second updating feature to obtain the second decoding output component.

In step S2210, the predicted image is generated based on the first decoding output component and the second decoding output component, and the third decoding output component and the fourth decoding output component are generated based on the predicted image, the second difference feature and the second superimposing feature.

Figure 23B:
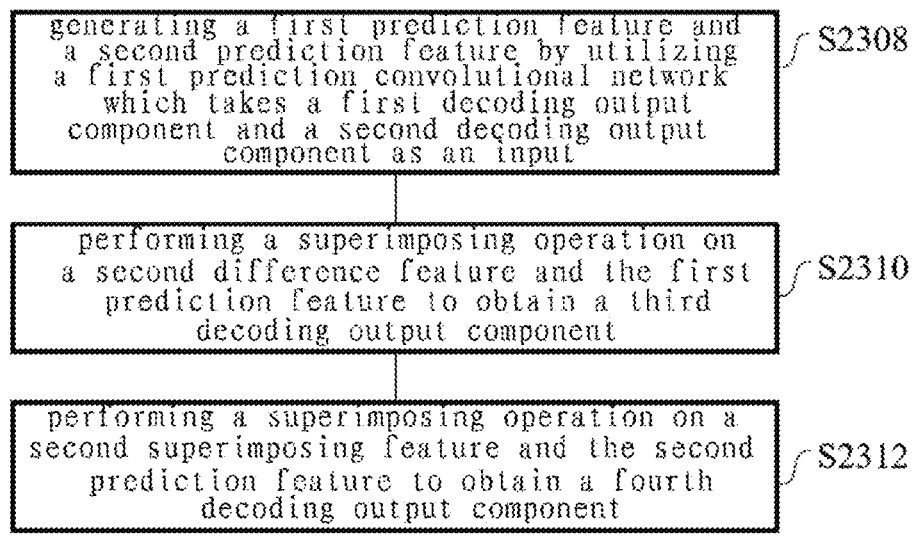
FIG. 23B shows a flow diagram of an image decoding method of an i-th stage of transform decoding unit according to some embodiments of the present application.

As shown in FIG. 23B, the step S2210 can further comprise: in step S2308, generating the first prediction feature and the second prediction feature by utilizing the first prediction convolutional network $P'_1$ which takes the first decoding output component and the second decoding output component as an input, wherein first prediction feature and the second prediction feature may be the same, or may be different; in step S2310, performing an superimposing operation on the second difference feature and the first prediction feature to obtain the third decoding output component; in step S2306, performing an superimposing operation on the second superimposing feature and the second prediction feature to obtain the fourth decoding output component.

FIG. 24 shows a flow diagram of an inverse wavelet transform method based on the first decoding input component and the second decoding input component. An inverse wavelet transform method 2400 can be performed by utilizing the inverse wavelet transforming unit 1130 as shown in FIG. 11. In step S2402, the third updating feature is generated by utilizing the second updating convolutional network $U'_{21}$ which takes the second decoding input component as the input. In step S2404, a de-superimposing operation is performed on the first decoding input component and the third updating feature to obtain the first difference feature. In step S2406, the third prediction feature is generated by utilizing the second prediction convolutional network $P'_{21}$ which takes the first difference feature as an input. In step S2408, an superimposing operation is performed on the second decoding input component and the third prediction feature to obtain the first superimposing feature.

FIG. 25 shows a flow diagram of an inverse wavelet transform method based on the third decoding input component and the fourth decoding input component. An inverse wavelet transform method 2500 can be performed by utilizing the inverse wavelet transforming unit 1140 as shown in FIG. 11. In step S2502, the fourth updating feature is generated by utilizing the third updating convolutional network U'$_{22}$ which takes the fourth decoding input component as an input. In step S2504, a de-superimposing operation is performed on the third decoding input component and the fourth updating feature to obtain the second difference feature. In step S2506, the fourth prediction feature is generated by utilizing the third prediction convolutional network P'$_{22}$ which takes the second difference feature as an input. In step S2508, an superimposing operation is performed on the fourth decoding input component and the fourth prediction feature to obtain the second superimposing feature.

The image decompression method provided in some embodiments of the present disclosure can restore the compressed image to the original image without losing any information.

Figure 26:
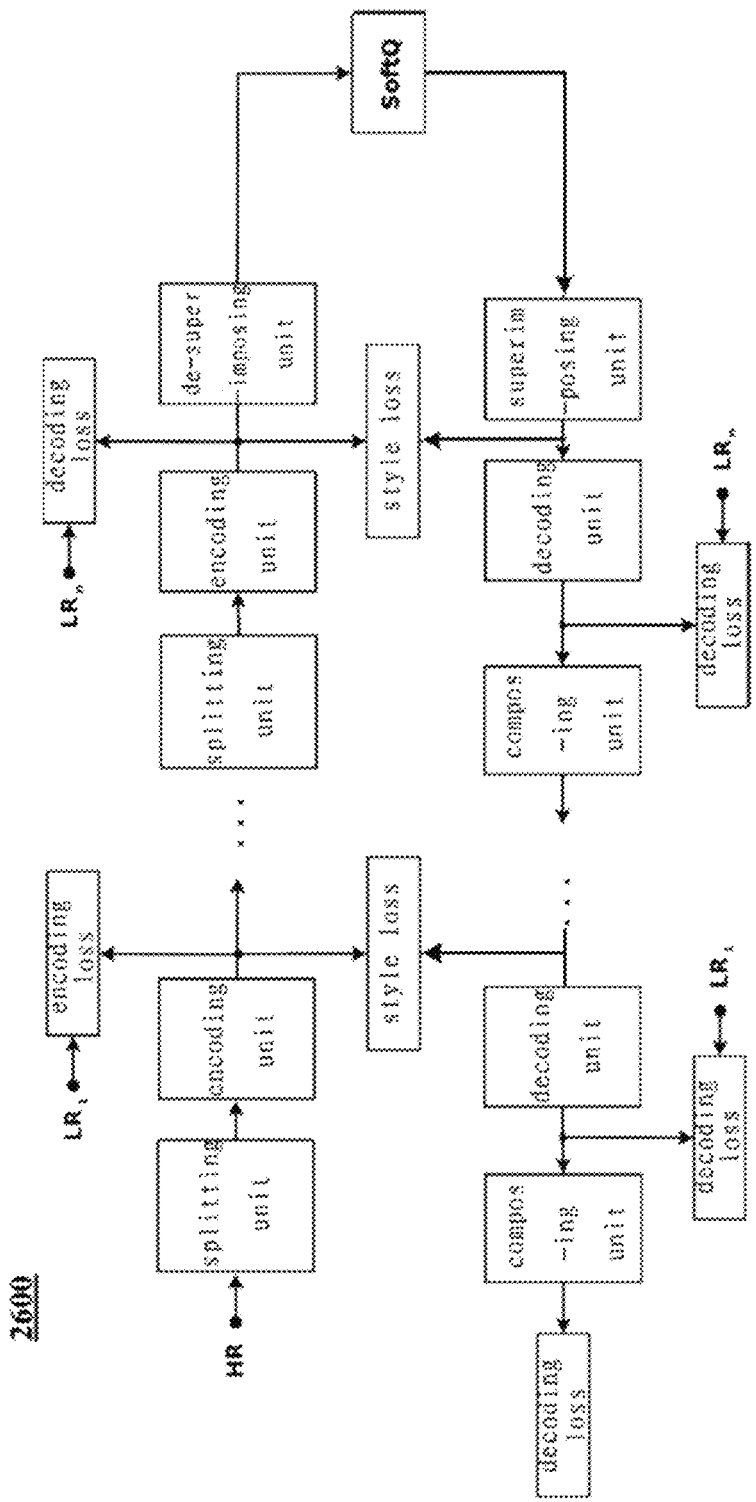
FIG. 26 shows a schematic diagram of an image processing system according to some embodiments of the present application.

FIG. 26 shows a schematic diagram of an image processing system according to some embodiments of the present disclosure. As shown in FIG. 13, the front part of an image processing system 2600 is the image compression device as shown in FIG. 4, which is configured to compress images. The behind half of the image processing system 2600 can be the image decompression device as shown in FIG. 9, which is configured to restore the compressed image. Compression and decompression processes can be realized by utilizing the image processing system 1400. Specific structures of the image compression device and the decompression device have been described in the above text, and thus no further details are given herein.

Configurations of parameters of respective convolutional network in the image processing system 1400 can be realized by utilizing the deep learning method.

The training method according to some embodiments of the present disclosure comprises following steps:

inputting a training image to the image processing system, adjusting weight values of respective convolutional networks in respective convolutional layers in n stages of encoding units and n stages of decoding units, and running a limited number of iterations to optimize a target function.

In the training, loss of the image information caused by the quantization operation can be reduced by reducing mean square error (MSE) of a quantized restored image. Since gradients of normal quantization functions are mostly zero, it is hard to be applied in the training process. Quantization effect can be simulated or approached by using a quantization function as defined below, and at the same time, the gradients are not zero, so that it is easy to perform a quantization operation in the process of training:

$$SOFT_{Q(F_j)} = \frac{1}{2} + \frac{1}{2L_j} \sum_{i=1}^{L_j} \tanh\left(a_j L_j \left(F_j + \frac{1}{2L_j} - \frac{i}{L_j}\right)\right)$$

As for the image processing system as shown in FIG. 26, a training image is input with respect to each stage of encoding units and decoding units. For example, an original high-resolution image HR is input to the input terminal of the image processing system.

In some embodiments, the target function can comprise one of encoding loss, decoding loss, style loss and weight regularization coefficient or a sum of several of the above. A computational method of the above loss function will be introduced in the following text.

After the HR image is processed by the first stage of encoding unit, encoding loss between a reference image REF$_1$ output by the first stage of encoding unit and a training image LR$_1$ of the first stage of encoding unit is calculated. The above encoding loss can be calculated via an encoding loss function;

$$L_{ENC_k} = \|REF_k - LR_k\|_2 + \sum_{\substack{i=1 \\ i \neq C_k}}^{C_0 \cdot m^k} \|C_{ki}\|_1$$

Herein, $$\|x\|_2 = \sum_i x_i^2, \|x\|_1 = \sum_i |x_i|$$

where REF$_k$ is a first image component output by a k-th stage of encoding unit, LR$_k$ is a training image of the k-th stage of encoding unit, wherein LR$_k$ is a downsampling image of the training image of the image processing system, and has a size as the same as REF$_k$; C$_0$ is an amount of the training image; C$_{ki}$ is an image component output by the k stage of encoding unit, where $1 \leq i \leq m^k - 1$.

Correspondingly, decoding loss between the reference image REF$_k$ output by the k-th stage of decoding unit and the training image of the k-th stage of decoding unit can be calculated in the process of decoding. The above decoding loss can be calculated via a decoding loss function:

$$L_{DEC_k} = IQ(REF_k, LR_k)$$

where the IQ function evaluates difference between REF$_k$ and LR$_k$. In some embodiments, the IQ function can be a MSE function:

$$MSE(X, Y) = \|X - Y\|_2$$

where X, Y represent image data of REF$_k$ and LR$_k$ respectively.

In some embodiments, the IQ function can be a SSIM function:

$$SSIM(X, Y) = \frac{(2\mu_X \mu_Y + c_1)(2\sigma_{XY} + c_2)}{(\mu_X^2 + \mu_Y^2 + c_1)(\sigma_X^2 + \sigma_Y^2 + c_2)}$$

where X, Y represent image data of REF$_k$ and LR$_k$ respectively. $\mu_X$ and $\mu_Y$ represent mean values of X and Y. $\sigma_X$ and $\sigma_Y$ represent standard deviations of X and Y, $c_1 = (0.01 \times D)^2$, $c_2 = (0.03 \times D)^2$, D indicates a dynamic scope of the image, for example, as for a float number, the value of D is normally 1.0.

Additionally, the type loss function at this stage can be calculated according to the output of the i-th stage of encoding unit and the input of a corresponding stage of decoding unit. For example, the type loss function of the first stage can be calculated according to the output of the first stage of encoding unit and the input of the n-th stage of decoding unit. The type loss function of the second stage can be calculated according to the output of the second stage of encoding unit and the input of the (n−1)-th stage of decoding unit. The style loss function can be defined through the following formula:

$$L_{STYLE_k}(X, Y) = \|G_X - G_U\|_2$$

where as for an image component F having m channels, $$G_F(k, l) = \frac{1}{hw} \sum_{i=1}^{m} F^k(i) F^l(i)$$

where $G_X$, $G_Y$ are characteristic quantity of Gram matrix of the image X and the image Y, X is an output image of the k-th stage of encoding unit, and Y is an output image of a (i+1−k)-th stage of encoding unit, where 1≤k≤n.

Additionally, the weight regularization coefficient of the system is defined as:

$$L_{REG} = \frac{\|W\|_1}{\|b\|_1}$$

where W is a weight parameter of all convolutional networks in the image processing system, and b is bias of all convolutional networks in the image processing system.

A total loss function of the image processing system can be calculated based on one or more of the above loss functions. The total loss function of the image processing system can be applied to any deep learning optimization strategy, such as Stochastic Gradient Descent SGD or its modifications (such as momentum SGD, Adam, RMSProp, etc.).

Through the training method of the image processing system provided by some embodiments of the present disclosure, parameter configuration can be performed on the convolutional neutral network in the image processing system by utilizing the deep learning strategy. By calculating the loss function between the images generated in the training image and the image processing system as the target function, parameters of the convolutional neural network in the image processing system are adjusted so that the target function is optimized, so as to realize a better compression effect.

It needs to note that in the specification, terms "comprising", "including" or any other variations intent to cover non-exclusive contains, so as that a process, a method, an object or a device including a series of elements not only comprises those elements, but also comprises other elements not listed explicitly, or further comprise elements which are inherent for the process, method, object or device. In the case of no more limitations, elements defined by the sentence "comprising one . . . " do not exclude that additional same elements also exist in the process, method, object or device of the elements.

Finally, it further needs to note that the above series of processes not only comprise processes performed according to a time sequence in an order described herein, but also comprise parallel or separate processes not performed in a time sequence.

Based on the description of the above implementations, it is clear for those skilled in the art to know that the present disclosure can be implemented by means of software together with necessary hardware platform. Of course, it can also be implemented by the hardware. Based on such understanding, all or part of the technical solutions of the present disclosure making contributions to the background art can be reflected in a form of a software product. This computer software product can be stored in a storage medium, such as ROM/RAM, a magnetic disk, an optical disk, etc., including several instructions so that one computer device (it may be a personal computer, a server, or a network device, etc.) performs the methods as recited in respective embodiments of the present disclosure or some parts of the embodiments.

The above description introduces the present disclosure in detail. Specific examples are applied in the text to describe principles and implementations of the present disclosure. Descriptions of the above embodiments are just used to help in understanding the methods and its core concepts of the present disclosure; at the same time, for those ordinary skilled in the art, according to the concept of the present disclosure, there may be alternations in specific implementation and applicable copes. To sum up, the content of the description shall not be understood as a limitation to the present disclosure.

What is claimed is:

1. An image compression method, comprising:
receiving an input image;
encoding the input image by utilizing n stages of encoding unit connected in cascades to produce an output image, where n is an integer greater than 1,
wherein an input of an i-th stage of encoding unit is an i-th stage of encoding input image and comprises $m^{i-1}$ image components, an output of the i-th stage of encoding unit is an i-th stage of encoding output image and comprises $m^i$ image components, and the output of the i-th stage of encoding unit is an input of a (i+1)-th stage of encoding unit, where 1≤i<n, m is an integer greater than 1;
wherein the output image comprises one image component as a reference image of the input image and $m^n-1$ image components corresponding to the input image.

2. The image compression method according to claim 1, wherein the input image, the reference image and each image component of the $m^n-1$ image components comprise three channels R, G, B.

3. The image compression method according to claim 1, further comprising:
performing an quantization operation on the reference image and the $m^n-1$ image components, to obtain a compressed image corresponding to the input image.

4. The image compression method according to claim 3, wherein the quantization operation is performed through a quantization function, and the quantization function is:

$$SOFT_{Q(F_j)} = \frac{1}{2} + \frac{1}{2L_j} \sum_{i=1}^{L_j} \tanh\left(a_j L_j\left(F_j + \frac{1}{2L_j} - \frac{i}{L_j}\right)\right)$$

where $L_j$ is a quantization level of a j-th output image, $a_j$ is a hardness parameter of a j-th image, and j is an integer greater than 1.

5. The image compression method according to claim 1, further comprising:
performing an image subtraction on the $m^n-1$ image components and the reference image respectively, to obtain a difference image of the $m^n-1$ image components and the reference image, and
performing the quantization operation on the reference image and the $m^n-1$ image components, to obtain the compressed image corresponding to the input image.

6. The image compression method according to claim 1, wherein for the i-th stage of encoding unit, the encoding comprises:

receiving the i-th stage of encoding input image;
for each image component in the i-th stage of encoding input image, splitting the image component into m encoding input components, wherein a size of each of the m encoding input components is 1/m of a size of each image component in the i-th stage of encoding input image; and image transforming the m encoding input components to generate m encoding output components corresponding to the image component, wherein a size of each of the m encoding output components is a same as a size of each of the m encoding input components;
outputting $m^i$ encoding output components corresponding to the $m^{i-1}$ image component of the i-th stage of encoding input image as an i-th stage of encoding output image.

7. The image compression method according to claim 6, wherein m=4, each image component in the i-th stage of encoding input image is split into a first encoding input component, a second encoding input component, a third encoding input component and a fourth encoding input component, the image transforming the first encoding input component, the second encoding input component, the third encoding input component and the fourth encoding input component by utilizing the i-th stage encoding unit comprises:
receiving the first encoding input component, the second encoding input component, the third encoding input component and the fourth encoding input component;
generating a predicted image based on the first encoding input component and the second encoding input component and obtaining a difference image of the third encoding input component and the fourth encoding input component and the predicted image;
generating an updated image relating to the first encoding input component and the second encoding input component based on the difference image, the first encoding input component and the second encoding component;
performing a wavelet transform based on the updated image, and generating a first encoding output component and a second encoding output component based on a result of the wavelet transform;
performing a wavelet transform based on the difference image, and generating a third encoding output component and a fourth encoding output component based on a result of the wavelet transform.

8. The image compression method according to claim 7, wherein the generating a predicted image based on the first encoding input component and the second encoding input component and obtaining a difference image of the third encoding input component and the fourth encoding input component and the predicted image comprises:
generating a first prediction feature and a second prediction feature by utilizing a first prediction convolutional network which takes the first encoding input component and the second encoding input component as an input;
performing an image subtraction on the third encoding input component and the first prediction feature to obtain a first difference feature;
performing an image subtraction on the fourth encoding input component and the second prediction feature to obtain a second difference feature;
the generating a updated image based on the difference image, the first encoding input component and the second encoding input component comprises:

generating a first updating feature and a second updating feature by utilizing a first updating convolutional network which takes the first difference feature and the second difference feature as an input;
performing an superimposing operation on the first encoding input component and the first updating feature to obtain a first superimposing feature;
performing an superimposing operation on the second encoding input component and the second updating feature to obtain a second superimposing feature.

9. The image compression method according to claim 8, wherein the performing a wavelet transform based on the updated image and generating a first encoding output component and a second encoding output component based on a result of the wavelet transform comprises:
generating a third prediction feature by utilizing a second prediction convolutional network which takes the first superimposing feature as an input;
performing an image subtraction on the second superimposing feature and the third prediction feature to obtain the second encoding output component;
generating a third updating feature by utilizing a second updating convolutional network which takes the second encoding output component as an input;
performing an superimposing operation on the first superimposing feature and the third updating feature to obtain the first encoding output component.

10. The training method according to claim 9, wherein the target function is a sum of one or more of following respective items:
an encoding loss function:

$$L_{ENC_k} = \|REF_k - LR_k\|_2 + \sum_{\substack{i=1 \\ i \neq C_k}}^{C_0 \cdot m^k} \|C_{ki}\|_1$$

where $REF_k$ is a first image component output by a k-th stage of encoding unit, $LR_k$ is a training image of the k-th stage of encoding unit, wherein $LR_k$ is a downsampling image of the training image of the image processing system, and has a size as same as $REF_k$; $C_0$ is an amount of the training image; $C_{ki}$ is an image component output by the k stage of encoding unit, where $1 \leq i \leq m^k - 1$;
a decoding loss function:

$$L_{DEC} = IQ(REF_k, LR_k)$$

where the IQ function evaluates a difference between $REF_k$ and $LR_k$;
a style loss function:

$$L_{STYLE_k}(X, Y) = \|G_X - G_Y\|_2$$

where $$G_F(k, l) = \frac{1}{hw} \sum_{i=1}^{m} F^k(i) F^l(i);$$

where $G_X$, $G_Y$ are characteristic quantity of Gram matrix of an image X and an image Y, X is an output image of the k-th stage of encoding unit, and Y is an output image of a (i+1−k)-th stage of encoding unit, where $1 \leq k \leq n$;

a weight regularization coefficient:

$$L_{REG} = \frac{\|W\|_1}{\|b\|_1}$$

where W is a weight parameter of all convolutional networks in the image processing system, and b is bias of all convolutional networks in the image processing system.

11. The image compression method according to claim 8, wherein the performing a wavelet transform based on the difference image and generating a third encoding output component and a fourth encoding output component based on a result of the wavelet transform comprises:
  generating a fourth prediction feature by utilizing a third prediction convolutional network which takes the first difference feature as an input;
  performing an image subtraction on the second difference feature and the fourth prediction feature to obtain the fourth encoding output component;
  generating a fourth updating feature by utilizing a third update convolutional network which takes the fourth encoding output component as an input;
  performing an superimposing operation on the first difference feature and the fourth updating feature to obtain the third encoding output component.

12. An image decompression method, comprising:
  receiving a compressed image, the compressed image including one image component as a reference image and $m^n-1$ image component, where m is an integer greater than 1, and n is an integer greater than 1;
  decoding the compressed image by utilizing n stages of decoding unit connected in cascades to produce a restored image,
  wherein an input of an i-th stage of decoding unit is an i-th stage of decoding input image and comprises $m^{i-1}$ image components, an output of the i-th stage of decoding unit is an i-th stage of decoding output image and comprises $m^{i-1}$ image components, and the output of the i-th stage of decoding unit is an input of a (i+1)-th stage of decoding unit, where 1≤i<n.

13. The image decompression method according to claim 12, wherein the reference image, each image component of the $m^n-1$ image components and the restored image comprise three channels R, G, B.

14. The image compression method according to claim 12, further comprising:
  performing an superimposing operation on the $m^n-1$ image components and the reference image, to obtain $m^n-1$ superimposing images of the $m^n-1$ image components and the reference image;
  image decoding the reference image and $m^n-1$ superimposing images by utilizing the n stages of decoding unit connected in cascades.

15. The image decompression method according to claim 12, wherein for the i-th stage of decoding unit, the image decoding comprises:
  receiving the i-th stage of decoding input image;
  image inverse transforming the $m^i$ image components, generating $m^i$ decoding output components corresponding to the i-th stage of decoding input image, wherein a size of each of the $m^i$ decoding output components is a same as a size of each of the $m^i$ image components;
  composing the $m^i$ decoding output components to $m^{i-1}$ decoding output sub-images, wherein a size of each of the $m^{i-1}$ decoding output sub-images is m times of a size of each of the $m^i$ image components;
  outputting $m^{i-1}$ encoding output sub-images corresponding to the $m^i$ image component of the i-th stage of decoding input image as an i-th stage of decoding output image.

16. The image decompression method according to claim 15, wherein m=4, the i-th stage of decoding input image comprises a first decoding input component, a second decoding input component, a third decoding input component and a fourth decoding input component, wherein each decoding input component comprises $4^{i-1}$ image components;
  performing an inverse wavelet transform based on the first decoding input component and the second decoding input component, and obtaining a first difference feature and a second superimposing feature based on a result of the inverse wavelet transform;
  performing an inverse wavelet transform based on the third decoding input component and the fourth decoding input component, and obtaining a second difference feature and a second superimposing feature based on a result of the inverse wavelet transform;
  generating an updated image based on the second difference feature and the second superimposing feature, and generating a first decoding output component and a second decoding output component based on the updated image, the first difference feature and the first superimposing feature;
  generating a predicted image based on the first decoding output component and the second decoding output component, and generating a third decoding output component and a fourth decoding output component based on the predicted image, the second difference feature and the second superimposing feature.

17. An image compression device, comprising one processor configured to execute the method according to claim 1.

18. An image processing system, comprising the image compression device according to claim 17 and the image decompression device, wherein the image decompression device, comprising at least one processor configured to:
  receive a compressed image, the compressed image including one image component as a reference image and $m^n-1$ image component, where m is an integer greater than 1, and n is an integer greater than 1;
  decode the compressed image by utilizing n stages of decoding unit connected in cascades to produce a restored image,
  wherein an input of an i-th stage of decoding unit is an i-th stage of decoding input image and comprises $m^{i-1}$ image components, an output of the i-th stage of decoding unit is an i-th stage of decoding output image and comprises $m^i$ image components, and the output of the i-th stage of decoding unit is an input of a (i+1)-th stage of decoding unit, where 1≤i<n; outputting the restore image corresponding to the compressed image.

19. A training method of the image processing system according to claim 18, comprising:
  inputting a training image to the image processing system, adjusting weight values of respective convolutional networks in respective convolutional layers in n stages of encoding units and n stages of decoding units, and running a limited number of iterations to optimize a target function.

20. An image decompression device, comprising at least one processor configured to execute the method according to claim 10.

* * * * *